US008472931B2

(12) United States Patent
Reding et al.

(10) Patent No.: US 8,472,931 B2
(45) Date of Patent: Jun. 25, 2013

(54) METHODS AND SYSTEMS FOR AUTOMATIC COMMUNICATION LINE MANAGEMENT BASED ON DEVICE LOCATION

(75) Inventors: Craig L. Reding, Medland Park, NJ (US); Christopher Helbling, Stamford, CT (US)

(73) Assignee: Telesector Resources Group, Inc., New York, NY (US)

( * ) Notice: Subject to any disclaimer, the term of this patent is extended or adjusted under 35 U.S.C. 154(b) by 2343 days.

(21) Appl. No.: 10/720,970

(22) Filed: Nov. 24, 2003

(65) Prior Publication Data

US 2004/0213212 A1     Oct. 28, 2004

Related U.S. Application Data

(60) Provisional application No. 60/428,704, filed on Nov. 25, 2002, provisional application No. 60/436,018, filed on Dec. 26, 2002.

(51) Int. Cl.
*H04M 3/42* (2006.01)

(52) U.S. Cl.
USPC .... 455/417; 455/41.2; 455/426.2; 455/550.1; 455/458; 455/414.1; 370/327; 370/328; 370/338; 370/351; 370/335; 379/44; 379/539

(58) Field of Classification Search
USPC .......... 455/417, 41.2, 426.2, 421, 550.1, 455/414.1, 414.3, 418, 419, 422.1; 370/327, 370/328, 338, 335, 351; 340/506, 825.44, 340/539; 379/58, 231, 206; 714/798
See application file for complete search history.

(56) References Cited

U.S. PATENT DOCUMENTS

| 4,013,839 A | 3/1977 | Bell |
| 4,540,850 A | 9/1985 | Herr et al. |

(Continued)

FOREIGN PATENT DOCUMENTS

| CA | 2240878 | 12/1998 |
| DE | 10110942 | 9/2002 |

(Continued)

OTHER PUBLICATIONS

"MP3 Recorder Download—MP3 Recorder—Record Audio Stream to MP3 or WAV," 2002 http://www.mp3-recorder.net.

(Continued)

*Primary Examiner* — Patrick N. Edouard
*Assistant Examiner* — Fred Casca

(57) ABSTRACT

Methods and Systems for managing one or more communications devices associated with a user of a communications network are disclosed. The methods and systems are capable of receiving an indication regarding wireless communications between a first device and a second device. This indication may indicate that the first device has entered or left a vicinity (or range) of a second device. Additionally, this may be accomplished by using a protocol such as Bluetooth protocol, the IEEE 802.11(b) protocol, and/or the IEEE 802.11 (g) protocol. For example, in an embodiment, if a first device (e.g., a Bluetooth-enabled wireless phone) enters the vicinity of a second device (e.g., a Bluetooth-enabled user computer), calls for the user may be automatically forwarded to a phone of the user that is located near the second device. Likewise, in an embodiment, if the first device (e.g., a Bluetooth-enabled wireless phone) leaves the vicinity of the second device (e.g., a Bluetooth-enabled computer), calls may be automatically forwarded to the first device.

17 Claims, 11 Drawing Sheets

U.S. PATENT DOCUMENTS

| | | |
|---|---|---|
| 4,600,814 A | 7/1986 | Cunniff et al. |
| 4,734,931 A | 3/1988 | Bourg et al. |
| 4,924,496 A | 5/1990 | Figa et al. |
| 5,014,303 A | 5/1991 | Velius |
| 5,168,515 A | 12/1992 | Gechter et al. |
| 5,222,125 A | 6/1993 | Creswell et al. |
| 5,274,700 A | 12/1993 | Gechter et al. |
| 5,327,486 A | 7/1994 | Wolff et al. |
| 5,329,578 A | 7/1994 | Brennan et al. |
| 5,428,663 A * | 6/1995 | Grimes et al. ............... 340/7.21 |
| 5,440,624 A | 8/1995 | Schoof |
| 5,483,586 A | 1/1996 | Sussman |
| 5,533,096 A | 7/1996 | Bales |
| 5,535,265 A | 7/1996 | Suwandhaputra |
| 5,548,636 A | 8/1996 | Bannister et al. |
| 5,550,907 A | 8/1996 | Carlsen |
| 5,583,564 A | 12/1996 | Rao et al. |
| 5,586,173 A | 12/1996 | Misholi et al. |
| 5,588,037 A | 12/1996 | Fuller et al. |
| 5,608,788 A | 3/1997 | Demlow et al. |
| 5,619,555 A | 4/1997 | Fenton et al. |
| 5,621,787 A | 4/1997 | McKoy et al. |
| 5,623,541 A | 4/1997 | Boyle et al. |
| 5,631,904 A | 5/1997 | Fitser et al. |
| 5,638,434 A | 6/1997 | Gottlieb et al. |
| 5,649,105 A | 7/1997 | Aldred et al. |
| 5,652,789 A | 7/1997 | Miner et al. |
| 5,661,788 A | 8/1997 | Chin |
| 5,668,863 A | 9/1997 | Bieselin et al. |
| 5,673,080 A | 9/1997 | Biggs et al. |
| 5,692,213 A | 11/1997 | Goldberg et al. |
| 5,710,591 A | 1/1998 | Bruno et al. |
| 5,712,903 A | 1/1998 | Bartholomew et al. |
| 5,715,444 A | 2/1998 | Danish et al. |
| 5,717,863 A | 2/1998 | Adamson et al. |
| 5,719,925 A | 2/1998 | Peoples |
| 5,724,412 A | 3/1998 | Srinivasan |
| 5,742,095 A | 4/1998 | Bryant et al. |
| 5,742,668 A | 4/1998 | Pepe et al. |
| 5,742,905 A | 4/1998 | Pepe et al. |
| 5,745,561 A | 4/1998 | Baker et al. |
| 5,745,884 A | 4/1998 | Carnegie et al. |
| 5,747,970 A | 5/1998 | Johnson et al. |
| 5,751,800 A | 5/1998 | Ardon |
| 5,752,191 A | 5/1998 | Fuller et al. |
| 5,764,901 A | 6/1998 | Skarbo et al. |
| 5,805,607 A | 9/1998 | Khu |
| 5,805,670 A | 9/1998 | Pons et al. |
| 5,841,837 A | 11/1998 | Fuller et al. |
| 5,864,603 A | 1/1999 | Haavisto et al. |
| 5,872,841 A | 2/1999 | King et al. |
| 5,875,242 A | 2/1999 | Glaser et al. |
| 5,875,437 A | 2/1999 | Atkins |
| 5,903,845 A | 5/1999 | Buhrmann et al. |
| 5,907,324 A | 5/1999 | Larson et al. |
| 5,907,547 A | 5/1999 | Foladare et al. |
| 5,917,817 A | 6/1999 | Dunn et al. |
| 5,917,912 A | 6/1999 | Ginter et al. |
| 5,920,826 A | 7/1999 | Metso et al. |
| 5,920,847 A | 7/1999 | Kolling et al. |
| 5,944,769 A | 8/1999 | Musk et al. |
| 5,945,989 A | 8/1999 | Freishtat et al. |
| 5,960,342 A | 9/1999 | Liem et al. |
| 5,963,925 A | 10/1999 | Kolling et al. |
| 5,982,870 A | 11/1999 | Pershan et al. |
| 6,005,870 A | 12/1999 | Leung et al. |
| 6,018,571 A | 1/2000 | Langlois et al. |
| 6,018,737 A | 1/2000 | Shah et al. |
| 6,021,428 A | 2/2000 | Miloslavsky |
| 6,029,151 A | 2/2000 | Nikander |
| 6,031,896 A | 2/2000 | Gardell et al. |
| 6,041,103 A | 3/2000 | La Porta et al. |
| 6,052,372 A | 4/2000 | Gittins et al. |
| 6,058,163 A | 5/2000 | Pattison et al. |
| 6,061,432 A | 5/2000 | Wallace et al. |
| 6,078,658 A | 6/2000 | Yunoki |
| 6,092,102 A | 7/2000 | Wagner |
| 6,100,882 A | 8/2000 | Sharman et al. |
| 6,122,348 A | 9/2000 | French-St. George et al. |
| 6,134,318 A | 10/2000 | O'Neil |
| 6,134,548 A | 10/2000 | Gottsman et al. |
| 6,144,671 A | 11/2000 | Perinpanathan et al. |
| 6,154,646 A | 11/2000 | Tran et al. |
| 6,161,008 A | 12/2000 | Lee et al. |
| 6,163,692 A | 12/2000 | Chakrabarti et al. |
| 6,167,119 A | 12/2000 | Bartholomew et al. |
| 6,188,756 B1 | 2/2001 | Mashinsky |
| 6,189,026 B1 | 2/2001 | Birrell et al. |
| 6,192,123 B1 | 2/2001 | Grunsted et al. |
| 6,195,660 B1 | 2/2001 | Polnerow et al. |
| 6,215,863 B1 | 4/2001 | Bennett et al. |
| 6,219,413 B1 | 4/2001 | Burg |
| 6,226,374 B1 | 5/2001 | Howell et al. |
| 6,240,449 B1 | 5/2001 | Nadeau |
| 6,260,050 B1 | 7/2001 | Yost et al. |
| 6,275,575 B1 | 8/2001 | Wu |
| 6,282,522 B1 | 8/2001 | Davis et al. |
| 6,298,062 B1 | 10/2001 | Gardell et al. |
| 6,298,129 B1 | 10/2001 | Culver et al. |
| 6,301,338 B1 | 10/2001 | Makela et al. |
| 6,301,609 B1 | 10/2001 | Aravamudan et al. |
| 6,310,939 B1 | 10/2001 | Varney |
| 6,310,947 B1 | 10/2001 | Polcyn |
| 6,324,269 B1 | 11/2001 | Malik |
| 6,333,973 B1 | 12/2001 | Smith et al. |
| 6,349,299 B1 | 2/2002 | Spencer et al. |
| 6,351,279 B1 | 2/2002 | Sawyer |
| 6,363,143 B1 | 3/2002 | Fox |
| 6,371,484 B1 | 4/2002 | Yuan |
| 6,373,817 B1 | 4/2002 | Kung et al. |
| 6,373,930 B1 | 4/2002 | McConnell et al. |
| 6,385,754 B1 | 5/2002 | Mizumoto et al. |
| 6,389,113 B1 | 5/2002 | Silverman |
| 6,404,873 B1 | 6/2002 | Beyda et al. |
| 6,408,191 B1 | 6/2002 | Blanchard et al. |
| 6,408,327 B1 | 6/2002 | McClennon et al. |
| 6,411,605 B1 | 6/2002 | Vance et al. |
| 6,418,214 B1 | 7/2002 | Smythe et al. |
| 6,430,176 B1 | 8/2002 | Christie |
| 6,430,289 B1 | 8/2002 | Liffick |
| 6,434,226 B1 | 8/2002 | Takahashi |
| 6,442,245 B1 | 8/2002 | Castagna et al. |
| 6,442,251 B1 | 8/2002 | Maes et al. |
| 6,442,748 B1 | 8/2002 | Bowman-Amuah |
| 6,453,031 B2 | 9/2002 | Malik |
| 6,453,167 B1 | 9/2002 | Michaels et al. |
| 6,459,780 B1 | 10/2002 | Wurster et al. |
| 6,459,913 B2 | 10/2002 | Cloutier |
| 6,463,145 B1 | 10/2002 | O'Neal et al. |
| 6,463,464 B1 | 10/2002 | Lazaridis et al. |
| 6,466,910 B1 | 10/2002 | Desmond et al. |
| 6,470,079 B1 | 10/2002 | Benson |
| 6,473,615 B1 | 10/2002 | Theppasandra et al. |
| 6,477,374 B1 | 11/2002 | Shaffer et al. |
| 6,480,830 B1 | 11/2002 | Ford et al. |
| 6,480,890 B1 | 11/2002 | Lee, Jr. et al. |
| 6,507,644 B1 | 1/2003 | Henderson et al. |
| 6,519,326 B1 | 2/2003 | Milewski et al. |
| 6,522,734 B1 | 2/2003 | Allen et al. |
| 6,526,134 B1 | 2/2003 | Wallenius |
| 6,532,285 B1 | 3/2003 | Tucker et al. |
| 6,535,596 B1 | 3/2003 | Frey et al. |
| 6,539,082 B1 | 3/2003 | Lowe et al. |
| 6,542,596 B1 | 4/2003 | Hill et al. |
| 6,546,005 B1 | 4/2003 | Berkley et al. |
| 6,547,830 B1 | 4/2003 | Mercer |
| 6,560,329 B1 | 5/2003 | Draginich et al. |
| 6,563,914 B2 | 5/2003 | Sammon et al. |
| 6,564,261 B1 | 5/2003 | Gudjonsson et al. |
| 6,574,324 B1 | 6/2003 | Malik |
| 6,574,470 B1 | 6/2003 | Chow et al. |
| 6,577,622 B1 | 6/2003 | Schuster et al. |
| 6,577,720 B1 | 6/2003 | Sutter |
| 6,584,122 B1 | 6/2003 | Matthews et al. |
| 6,590,603 B2 | 7/2003 | Sheldon et al. |
| 6,590,969 B1 | 7/2003 | Peters et al. |
| 6,594,352 B1 | 7/2003 | Smith |

| | | |
|---|---|---|
| 6,594,470 B1 | 7/2003 | Barnes et al. |
| 6,600,736 B1 | 7/2003 | Ball et al. |
| 6,609,113 B1 | 8/2003 | O'Leary et al. |
| 6,611,590 B1 | 8/2003 | Lu et al. |
| 6,614,786 B1 | 9/2003 | Byers |
| 6,618,710 B1 | 9/2003 | Zondervan et al. |
| 6,625,258 B1 | 9/2003 | Ram et al. |
| 6,628,194 B1 | 9/2003 | Hellebust et al. |
| 6,628,770 B1 | 9/2003 | Jain et al. |
| 6,631,186 B1 | 10/2003 | Adams et al. |
| 6,636,587 B1 | 10/2003 | Nagai et al. |
| 6,643,356 B1 | 11/2003 | Hickey et al. |
| 6,654,768 B2 | 11/2003 | Celik |
| 6,661,340 B1 | 12/2003 | Saylor et al. |
| 6,665,388 B2 | 12/2003 | Bedingfield |
| 6,668,046 B1 | 12/2003 | Albal |
| 6,668,049 B1 | 12/2003 | Koch et al. |
| 6,681,119 B1 | 1/2004 | Verdonk |
| 6,683,939 B1 | 1/2004 | Chiloyan et al. |
| 6,687,362 B1 | 2/2004 | Lindquist et al. |
| 6,690,672 B1 | 2/2004 | Klein |
| 6,693,897 B1 | 2/2004 | Huang |
| 6,697,461 B1 | 2/2004 | Middleswarth et al. |
| 6,697,796 B2 | 2/2004 | Kermani |
| 6,704,294 B1 | 3/2004 | Cruickshank |
| 6,711,158 B1 | 3/2004 | Kahane et al. |
| 6,717,938 B1 | 4/2004 | D'Angelo |
| 6,718,026 B1 | 4/2004 | Pershan et al. |
| 6,718,178 B1 | 4/2004 | Sladek et al. |
| 6,731,238 B2 | 5/2004 | Johnson |
| 6,735,292 B1 | 5/2004 | Johnson |
| 6,738,458 B1 | 5/2004 | Cline et al. |
| 6,744,861 B1 | 6/2004 | Pershan et al. |
| 6,748,054 B1 | 6/2004 | Gross et al. |
| 6,757,365 B1 | 6/2004 | Bogard |
| 6,768,788 B1 | 7/2004 | Langseth et al. |
| 6,768,790 B1 | 7/2004 | Manduley et al. |
| 6,771,949 B1 | 8/2004 | Corliss |
| 6,775,267 B1 | 8/2004 | Kung et al. |
| 6,775,546 B1 | 8/2004 | Fuller |
| 6,788,772 B2 | 9/2004 | Barak et al. |
| 6,788,775 B1 | 9/2004 | Simpson |
| 6,792,092 B1 | 9/2004 | Michalewicz |
| 6,798,753 B1 | 9/2004 | Doganata et al. |
| 6,801,610 B1 | 10/2004 | Malik |
| 6,807,258 B1 | 10/2004 | Malik |
| 6,807,259 B1 | 10/2004 | Patel et al. |
| 6,816,468 B1 | 11/2004 | Cruickshank |
| 6,816,469 B1 | 11/2004 | Kung et al. |
| 6,820,055 B2 | 11/2004 | Saindon et al. |
| 6,842,460 B1 * | 1/2005 | Olkkonen et al. ............. 370/465 |
| 6,847,823 B2 * | 1/2005 | Lehikoinen et al. ........ 455/456.1 |
| 6,853,634 B1 | 2/2005 | Davies et al. |
| 6,853,713 B1 | 2/2005 | Fobert et al. |
| 6,856,974 B1 | 2/2005 | Ganesan et al. |
| 6,876,632 B1 | 4/2005 | Takeda |
| 6,876,736 B2 | 4/2005 | Lamy et al. |
| 6,882,714 B2 | 4/2005 | Mansfield |
| 6,882,838 B1 | 4/2005 | Lee et al. |
| 6,885,742 B1 | 4/2005 | Smith |
| 6,907,111 B1 | 6/2005 | Zhang et al. |
| 6,917,610 B1 | 7/2005 | Kung et al. |
| 6,944,279 B2 | 9/2005 | Elsey et al. |
| 6,947,538 B2 | 9/2005 | Shen et al. |
| 6,954,521 B2 | 10/2005 | Bull et al. |
| 6,954,524 B2 | 10/2005 | Gibson |
| 6,956,942 B2 | 10/2005 | McKinzie et al. |
| 6,958,984 B2 * | 10/2005 | Kotzin ........................ 370/335 |
| 6,961,409 B1 | 11/2005 | Kato |
| 6,963,857 B1 | 11/2005 | Johnson |
| 6,970,705 B2 | 11/2005 | Yoshimoto et al. |
| 6,996,227 B2 | 2/2006 | Albal et al. |
| 6,996,370 B2 * | 2/2006 | De Loye et al. ............. 455/41.2 |
| 6,999,563 B1 | 2/2006 | Thorpe et al. |
| 7,024,209 B1 | 4/2006 | Gress et al. |
| 7,027,435 B2 | 4/2006 | Bardehle |
| 7,031,437 B1 | 4/2006 | Parsons et al. |
| 7,043,521 B2 | 5/2006 | Eitel |
| 7,065,198 B2 | 6/2006 | Brown et al. |
| 7,068,768 B2 | 6/2006 | Barnes |
| 7,076,528 B2 | 7/2006 | Premutico |
| 7,099,288 B1 | 8/2006 | Parker et al. |
| 7,107,312 B2 | 9/2006 | Hackbarth et al. |
| 7,116,972 B1 | 10/2006 | Zhang et al. |
| 7,127,050 B2 | 10/2006 | Walsh et al. |
| 7,130,390 B2 | 10/2006 | Abburi |
| 7,139,728 B2 | 11/2006 | Rigole |
| 7,139,782 B2 | 11/2006 | Osaki |
| 7,142,646 B2 | 11/2006 | Zafar et al. |
| 7,149,773 B2 | 12/2006 | Haller et al. |
| 7,155,001 B2 | 12/2006 | Tiliks et al. |
| 7,174,306 B1 | 2/2007 | Haseltine |
| 7,181,417 B1 | 2/2007 | Langseth et al. |
| 7,187,932 B1 | 3/2007 | Barchi |
| 7,190,773 B1 | 3/2007 | D'Silva et al. |
| 7,209,955 B1 | 4/2007 | Major et al. |
| 7,212,808 B2 | 5/2007 | Engstrom et al. |
| 7,245,929 B2 | 7/2007 | Henderson et al. |
| 7,254,220 B1 | 8/2007 | Reding et al. |
| 7,254,643 B1 | 8/2007 | Peters et al. |
| 7,283,808 B2 | 10/2007 | Castell et al. |
| 7,289,489 B1 | 10/2007 | Kung et al. |
| 7,308,087 B2 | 12/2007 | Joyce et al. |
| 7,315,614 B2 | 1/2008 | Bedingfield et al. |
| 7,379,538 B1 | 5/2008 | Ali et al. |
| 7,418,090 B2 | 8/2008 | Reding et al. |
| 7,428,580 B2 | 9/2008 | Hullfish et al. |
| 7,546,337 B1 | 6/2009 | Crawford |
| 7,616,747 B2 | 11/2009 | Wurster et al. |
| 7,912,193 B2 | 3/2011 | Chingon et al. |
| 2001/0003202 A1 | 6/2001 | Mache et al. |
| 2001/0012286 A1 | 8/2001 | Huna et al. |
| 2001/0014863 A1 | 8/2001 | Williams, III |
| 2001/0017777 A1 | 8/2001 | Maruyama et al. |
| 2001/0025262 A1 | 9/2001 | Ahmed |
| 2001/0025280 A1 | 9/2001 | Mandato et al. |
| 2001/0032181 A1 | 10/2001 | Jakstadt et al. |
| 2001/0039191 A1 | 11/2001 | Maierhofer |
| 2001/0040954 A1 | 11/2001 | Brachman et al. |
| 2001/0043689 A1 | 11/2001 | Malik |
| 2001/0043690 A1 | 11/2001 | Bakshi et al. |
| 2001/0043691 A1 | 11/2001 | Bull et al. |
| 2001/0051534 A1 | 12/2001 | Amin |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |
| 2002/0035617 A1 | 3/2002 | Lynch et al. |
| 2002/0040355 A1 | 4/2002 | Weiner |
| 2002/0046299 A1 | 4/2002 | Lefeber et al. |
| 2002/0055351 A1 | 5/2002 | Elsey et al. |
| 2002/0057678 A1 | 5/2002 | Jiang et al. |
| 2002/0062251 A1 | 5/2002 | Anandan et al. |
| 2002/0064268 A1 | 5/2002 | Pelletier |
| 2002/0069060 A1 | 6/2002 | Cannavo et al. |
| 2002/0069096 A1 | 6/2002 | Lindoerfer et al. |
| 2002/0071539 A1 | 6/2002 | Diament et al. |
| 2002/0073163 A1 | 6/2002 | Churchill et al. |
| 2002/0075303 A1 | 6/2002 | Thompson et al. |
| 2002/0075306 A1 | 6/2002 | Thompson et al. |
| 2002/0076022 A1 | 6/2002 | Bedingfield |
| 2002/0076026 A1 | 6/2002 | Batten |
| 2002/0076027 A1 | 6/2002 | Bernnan et al. |
| 2002/0077082 A1 | 6/2002 | Cruickshank |
| 2002/0078153 A1 | 6/2002 | Chung et al. |
| 2002/0080942 A1 | 6/2002 | Clapper |
| 2002/0082028 A1 | 6/2002 | Wittenkamp |
| 2002/0082030 A1 | 6/2002 | Berndt et al. |
| 2002/0083462 A1 | 6/2002 | Arnott |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0100798 A1 | 8/2002 | Farrugia et al. |
| 2002/0103864 A1 | 8/2002 | Rodman et al. |
| 2002/0103898 A1 | 8/2002 | Moyer et al. |
| 2002/0110121 A1 | 8/2002 | Mishra |

| | | |
|---|---|---|
| 2002/0115471 A1* | 8/2002 | De Loye et al. .............. 455/552 |
| 2002/0122545 A1 | 9/2002 | Schwab et al. |
| 2002/0126817 A1 | 9/2002 | Hariri et al. |
| 2002/0128025 A1 | 9/2002 | Sin |
| 2002/0128033 A1 | 9/2002 | Burgess |
| 2002/0137507 A1 | 9/2002 | Winkler |
| 2002/0137530 A1 | 9/2002 | Karve |
| 2002/0138468 A1 | 9/2002 | Kermani |
| 2002/0146105 A1 | 10/2002 | McIntyre |
| 2002/0147777 A1 | 10/2002 | Hackbarth et al. |
| 2002/0147811 A1 | 10/2002 | Schwartz et al. |
| 2002/0152165 A1 | 10/2002 | Dutta et al. |
| 2002/0154210 A1 | 10/2002 | Ludwig et al. |
| 2002/0168055 A1 | 11/2002 | Crockett et al. |
| 2002/0177410 A1* | 11/2002 | Klein et al. .................. 455/41 |
| 2002/0178117 A1 | 11/2002 | Maguire et al. |
| 2002/0187794 A1 | 12/2002 | Fostick et al. |
| 2003/0005150 A1 | 1/2003 | Thompson et al. |
| 2003/0014488 A1 | 1/2003 | Dalal et al. |
| 2003/0035381 A1 | 2/2003 | Chen et al. |
| 2003/0036380 A1 | 2/2003 | Skidmore |
| 2003/0045309 A1 | 3/2003 | Knotts |
| 2003/0046071 A1 | 3/2003 | Wyman |
| 2003/0053612 A1 | 3/2003 | Henrikson et al. |
| 2003/0055735 A1 | 3/2003 | Cameron et al. |
| 2003/0055906 A1 | 3/2003 | Packham et al. |
| 2003/0058838 A1 | 3/2003 | Wengrovitz |
| 2003/0063732 A1 | 4/2003 | Mcknight et al. |
| 2003/0069874 A1 | 4/2003 | Hertzog et al. |
| 2003/0083040 A1 | 5/2003 | Ruth et al. |
| 2003/0092451 A1* | 5/2003 | Holloway et al. .............. 455/461 |
| 2003/0093700 A1 | 5/2003 | Yoshimoto et al. |
| 2003/0096626 A1 | 5/2003 | Sabo et al. |
| 2003/0097635 A1 | 5/2003 | Giannetti |
| 2003/0104827 A1 | 6/2003 | Moran et al. |
| 2003/0108172 A1 | 6/2003 | Petty et al. |
| 2003/0112928 A1 | 6/2003 | Brown et al. |
| 2003/0112952 A1 | 6/2003 | Brown et al. |
| 2003/0119532 A1 | 6/2003 | Hatch |
| 2003/0140004 A1 | 7/2003 | O'Leary et al. |
| 2003/0142798 A1 | 7/2003 | Gavette et al. |
| 2003/0147518 A1 | 8/2003 | Albal et al. |
| 2003/0149662 A1 | 8/2003 | Shore |
| 2003/0158860 A1 | 8/2003 | Caughey |
| 2003/0165223 A1 | 9/2003 | Timmins et al. |
| 2003/0167229 A1 | 9/2003 | Ludwig et al. |
| 2003/0169330 A1 | 9/2003 | Ben-Shachar et al. |
| 2003/0179743 A1 | 9/2003 | Bosik et al. |
| 2003/0179864 A1 | 9/2003 | Stillman et al. |
| 2003/0187992 A1 | 10/2003 | Steenfeldt et al. |
| 2003/0208541 A1 | 11/2003 | Musa |
| 2003/0217097 A1 | 11/2003 | Eitel |
| 2003/0228863 A1 | 12/2003 | Vander Veen et al. |
| 2004/0002350 A1 | 1/2004 | Gopinath et al. |
| 2004/0002902 A1 | 1/2004 | Muehlhaeuser |
| 2004/0019638 A1 | 1/2004 | Makagon et al. |
| 2004/0034700 A1 | 2/2004 | Polcyn |
| 2004/0037409 A1 | 2/2004 | Crockett et al. |
| 2004/0044658 A1 | 3/2004 | Crabtree et al. |
| 2004/0052356 A1 | 3/2004 | McKinzie et al. |
| 2004/0081292 A1 | 4/2004 | Brown et al. |
| 2004/0103152 A1 | 5/2004 | Ludwig et al. |
| 2004/0119814 A1 | 6/2004 | Clisham et al. |
| 2004/0127256 A1 | 7/2004 | Goldthwaite et al. |
| 2004/0156491 A1 | 8/2004 | Reding et al. |
| 2004/0184593 A1 | 9/2004 | Elsey et al. |
| 2004/0203942 A1 | 10/2004 | Dehlin |
| 2004/0208305 A1 | 10/2004 | Gross et al. |
| 2004/0236792 A1 | 11/2004 | Celik |
| 2004/0247088 A1 | 12/2004 | Lee |
| 2004/0249884 A1 | 12/2004 | Caspi et al. |
| 2004/0264654 A1 | 12/2004 | Reding et al. |
| 2005/0053206 A1 | 3/2005 | Chingon et al. |
| 2005/0053221 A1 | 3/2005 | Reding et al. |
| 2005/0102382 A1 | 5/2005 | MacGregor et al. |
| 2005/0117714 A1 | 6/2005 | Chingon et al. |
| 2005/0129208 A1 | 6/2005 | McGrath et al. |
| 2005/0149487 A1 | 7/2005 | Celik |
| 2005/0191994 A1 | 9/2005 | May et al. |
| 2005/0216421 A1 | 9/2005 | Barry et al. |
| 2005/0220286 A1 | 10/2005 | Valdez et al. |
| 2005/0243993 A1 | 11/2005 | McKinzie et al. |
| 2006/0093120 A1 | 5/2006 | Thorpe et al. |
| 2006/0095575 A1 | 5/2006 | Sureka et al. |
| 2006/0168140 A1 | 7/2006 | Inoue et al. |
| 2006/0276179 A1 | 12/2006 | Ghaffari et al. |
| 2006/0277213 A1 | 12/2006 | Robertson et al. |
| 2007/0021111 A1 | 1/2007 | Celik |
| 2009/0060155 A1 | 3/2009 | Chingon et al. |

FOREIGN PATENT DOCUMENTS

| | | |
|---|---|---|
| DE | 10255489 A1 * | 6/2004 |
| EP | 0818908 | 1/1998 |
| EP | 0818908 A3 | 1/1998 |
| EP | 1014630 | 6/2000 |
| EP | 1028578 | 8/2000 |
| EP | 1161063 | 12/2001 |
| EP | 1193617 | 4/2002 |
| EP | 1235387 | 8/2002 |
| EP | 1294201 | 3/2003 |
| JP | 59-169264 | 9/1984 |
| JP | 02-260750 | 10/1990 |
| JP | 04-336742 | 11/1992 |
| JP | 05-316233 | 11/1993 |
| JP | 6-113020 | 4/1994 |
| JP | 07-030664 | 1/1995 |
| JP | 07-058856 | 3/1995 |
| JP | 07-107171 | 4/1995 |
| JP | 07-107549 | 4/1995 |
| JP | 07-123098 | 5/1995 |
| JP | 08-149226 | 6/1996 |
| JP | 08-181763 | 7/1996 |
| JP | 08-298546 | 11/1996 |
| JP | 8-331642 | 12/1996 |
| JP | 09-064869 | 3/1997 |
| JP | 09-064977 | 3/1997 |
| JP | 09-083651 | 3/1997 |
| JP | 09-200350 | 7/1997 |
| JP | 09-223087 | 8/1997 |
| JP | 9-261759 | 10/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000-224301 | 8/2000 |
| JP | 2000-270307 | 9/2000 |
| JP | 2000-349902 | 12/2000 |
| JP | 2001-144859 | 5/2001 |
| JP | 2001-156921 | 6/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | 2002-016673 | 1/2002 |
| JP | 2002-41522 | 2/2002 |
| JP | 2002-044123 | 2/2002 |
| JP | 2002-044257 | 2/2002 |
| JP | 2002-057807 | 2/2002 |
| JP | 2002-094696 | 3/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 2002-300290 | 10/2002 |
| JP | 2002-300306 | 10/2002 |

| | | |
|---|---|---|
| WO | WO-95/12948 | 5/1995 |
| WO | WO-96/14704 | 5/1996 |
| WO | WO-97/20423 | 6/1997 |
| WO | WO-97/33421 | 9/1997 |
| WO | WO-98/02007 | 1/1998 |
| WO | WO-99/38309 | 7/1999 |
| WO | WO-00/45557 | 8/2000 |
| WO | WO-00/60837 | 10/2000 |
| WO | WO-00/64133 | 10/2000 |
| WO | WO01/11586 | 2/2001 |
| WO | WO 01/11586 A1 | 2/2001 |
| WO | WO-01/22751 | 3/2001 |
| WO | WO-01/35621 | 5/2001 |
| WO | WO-01/52513 | 7/2001 |
| WO | WO-01/89212 | 11/2001 |
| WO | WO-02/25907 | 3/2002 |
| WO | 02/43338 | 5/2002 |

OTHER PUBLICATIONS

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.
U.S. Appl. No. 09/828,679, filed Apr. 6, 2001, Reding et al.
U.S. Appl. No. 09/785,223, filed Feb. 16, 2001, Swingle et al.
"A Model for Presence and Instant Messaging", M. Day, et al. Fujitsu, Feb. 2000, Network Working Group, Request for Comments 2778.
"MP3 Recorder Download—MP3 Recorder—Record Audio Stream to MP3 or WAV," 2002, http://www.mp3-recorder.net.
"FAQ Premium Home Answer" eVoice, http://content.evoice.com/wcs/signUp/FAQ_premHA_s01.htm.
"Voice-ASP, White Paper Technology & Processes," eVoice, Dec. 13, 2000.
"Voice-ASP, White Paper: Market Opportunities for Enhanced Voicemail," eVoice, Nov. 10, 2000.
"Audio Digitizing Process," TalkBank, http://www.talkbank.org/da/audiodig.html.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.
"Macromedia SoundEdit 16 Support Center-Working with Other Programs, What is Shockwave Audio Streaming?" http://www.macromedia.com/support/soundedit/how/shock/whatis.html.
"Chapter 3: Overview," last updated Dec. 2, 1999, http://service.real.com/help/library/guides/g270/htmfiles/overview.htm.
"How Internet Radio Works," Howstuffworks, http://computer.howstuffworks.com/internet-radio.htm/printable.
"Telecommunications and Personal Management Services Linked in Collaboration by Verizon and Microsoft," Oct. 23, 2001, http://www.microsoft.com/presspass/press/2001/oct01/10-23MSVerizonPr.asp.
"Real-Time Collaboration Integration in the Portal," T. Odenwald, SAP Design Guild, http://www.sapdesignguild.org/editions/edition5/synch_collab.asp.
"NetMeeting101," http://www.meetingbywire.com/NetMeeting101.htm.
"NetMeeting102," http://www.meetingbywire.com/NetMeeting102.htm.
"Instructions on Application Sharing and Data Collaboration," VCON Escort and Cruiser, http://www.vide.gatech.edu/docs/share/.
"Instructions on Multipoint Application Sharing and Data Collaboration," VCON Escort and Cruiser with the RadVision MCU, http://www.vide.gatech.edu/docs/multi-share/.
"File Transfer," Microsoft Windows Technologies Windows NetMeeting, last updated Jun. 4, 1999, http://www.microsoft.com/windows/netmeeting/features/files/default.asp.
"From Dial Tone to Media Tone," Analyst: R. Mahowald, IDC, Jun. 2002.
"MediaTone—The 'Dial Tone' for Web Communications Services," Webex, 2003.

Business Solutions/Professional, http://www.accessline.com/business_sol/bs_professional_body.html.
"Accessline Comms' Accessline Service, The One-Number Wonder," *CommWeb*, T. Kramer, Feb. 1, 2000, http://www.cconvergence.com/article/TCM20000504S0014.
"InteleScreener," 2003, http://www.intelescreener.com/howitworks.html.
"TeleZapper from Privacy Technologies," Privacy Corps—Our Review, 2002, http://www.privacycorps.com/pages/product1.htm.
"A Proposal for Internet Call Waiting Service Using SIP," A. Brusilovsky et al., Lucent Technologies, PINT Working Group, Internet Draft, Jan. 1999.
"A Model for Presence and Instant Messaging," M. Day et al., Fujitsu, Feb. 2000, Network Working Group, Request for Comments 2778.
Data Connection, Strategic Computer Technology, MeetingServer, "Broadband for Learning Case Study," Data Connection Ltd, 1998-2004, http://www.dataconnection.com/conferencing/meetingserver_casestudy.htm.
Data Connection, MailNGen, "Next Generation Messaging for Service Providers," Data Connection Limited, 2003-4.
Data Connection, Strategic Computer Technology, "Directories Explained," Data Connection Ltd, 1998-2004, http://www.dataconnection.com/inetapps/direxpl.htm.
Data Connection, Strategic Computer Technology, Directory Systems, "Directories and Meta-Directories," Data Connection Ltd, 1998-2004, http://www.dataconnection.com/inetapps/directory.htm.
Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.
Data Connection, Strategic Software Technology, "DC-SurroundSuite for Service Providers," Data Connection Ltd, 1998-2000, http://web.archive.org/web/20000914200355/www.dataconnection.com/messging/spssuite.htm.
Data Connection, Strategic Computer Technology, "Messaging Software Products and Services," Data Connection Ltd, 1998-2000, http://web.archive.org/web/20000819063320/www.dataconnection.com/messging/messgidx.htm.
Data Connection, Strategic Software Technology, "DC-Share for UNIX," Data Connection Ltd, 1998-2000, http://web.archive.org/web/2000914200713/www.dataconnection.com/conf/DCshare.htm.
Data Connection, Strategic Software Technology, "DC-H.323," Data Connection Ltd, 1998-2000, http://web.archive.org/web/20001120050600/www.dataconnection.com/conf/h323.htm.
Data Connection, Strategic Computer Technology, "DC-WebShare," Data Connection Ltd, 1998-2000, http://web.archive.org/web/20001016115016/www.dataconnection.com/conf/webshare.htm.
Data Connection, Strategic Computer Technology, "DC-Recorder," Data Connection Ltd, 1998-2000, http://web.archive.org/web/20001016055611/www.dataconnection.com/conf/recorder/htm.
Data Connection, Strategic Software Technology, "DC-MeetingServer," Data Connection Ltd, 1998-2000, http://web.archive.org/web/20000914200719/www.dataconnecton.com/conf/meetingserver.htm.
Data Connection, Strategic Computer Technology, "DC-MeetingServer," Data Connection Ltd, 1998-2000, http://web.archive.org/web/20021201144529/www.dataconnection.com/inetapps/conferencing.htm.
Data Connection, Strategic Software Technology, "DC-VoiceNet Features," Data Connection Ltd, 1998-2000, http://web.archive.org/web/20001016102614/www.dataconnection.com/messging/vnfeat.htm.
Data Connection, Strategic Software Technology, "DC-VoiceNet," Data Connection Ltd, 1998-2000, http://web.archive.org/web/20000914200424/www.dataconnection.com/messging/vnet.htm.
Data Connection, Strategic Computer Technology, "Messaging Software Products and Services," Data Connection Ltd, 1998-2000, http://web.archive.org/web/20010305143803/www.dataconnection.com/messging/messgidx.htm.
Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.

Data Connection, "SmartDialer Functional Overview," Version v1.0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004.

Data Connection, "Integrating Voicemail Systems, A white paper describing the integration of heterogeneous voicemail systems," Michael James, Internet Applications Group, Data Connection Ltd., 2004.

Data Connection, Strategic Computer Technology, "MailNGen: Next generation messaging for Service Providers," Data Connection Ltd, 1998-2004, http://www.dataconnection.com/messaging/.

Data Connection, Strategic Computer Technology, "MailNGen: Unified Messaging," Data Connection Ltd, 1998-2004, http://www.dataconnection.com/messaging/unified_messaging.htm.

Data Connection, Strategic Computer Technology, "MeetingServer: The award-winning web conferencing solution for Service Providers," Data Connection Ltd, 1998-2005, http://www.dataconnection.com/conferencing/.

Data Connection, Strategic Computer Technology, "MeetingServer: The web conferencing solution for Service Providers," Data Connection Ltd, 1998-2004, http://www.dataconnection.com/conferencing/meetingserver.htm.

Data Connection, Strategic Computer Technology, "MeetingServer: Web conferencing architecture," Data Connection Ltd, 1998-2004, http://www.dataconnection.com/conferencing/meetingserver_arch.htm.

"The Mobile Phone User Guide", http://www.mobileshop.org/usertech/wildfire,htm, printed Oct. 1, 2004.

"www.clicktocall.com", http://replay.waybackmachine.org/20020207142936/http://www.clicktocall.com/main.htm, Internet archive of website "www.dicktocall.com", dated Feb. 7, 2002.

Cisco Systems, "Cisco Personal Assistant 1.4", Cisco Personal Assistant 1.4, Cisco Systems, Jun. 24, 2003, http://www.cisco.com/en/US/products/sw/voicesw/ps2026/prod_presentation_list.html, printed Oct. 1, 2004, Jun 24, 2003.

Muller, "Desktop Encyclopedia of the Internet," Artech House Inc., 1999, pp. v-xiv, 233-246, 539-559, Jan. 1, 1999.

Gralla, "How the Internet Works," Ziff-Davis Press, 1999, pp. vi-xi, 2-3, 8-11, 308-324, Jan. 1, 1999.

Kornowski, J., "Wildfire at Your Back and Call-A Voice-Activated Telephone Assistant That Minds You and Your Messages", pp. 1-5, http://www.lacba.org/lalawyer/techwildfire.html, printed Oct. 1, 2004.

Muller, "Calendar Scheduling Teleconference Communication Mechanism", IBM Technical Disclosure Bulletin, IBM Corp. New York, US, vol. 37, No. 3, Mar. 1, 1994, p. 561, Mar. 1, 1994

White, "How Computers Work," Millenium Edition, Sep. 1999, Que Corporation, pp. vi-xi, 135-184, 399-421, Sep. 1, 1999.

Derfler, et al., "How Networks Work", Bestseller Edition, 1996, Ziff-Davis Press, pp. vi-ix, 1-3, 21-70, 190-198, Jan. 1, 1996.

Gaedke, at al., "Web Content Delivery to Heterogeneous Mobile Platforms", Advances in Database Technologies, Lecture Notes in Computer Science (LNCS), vol. 1552, Springer Verlag, Nov. 16-19, 1998.

Gessler et al., "PDAs as mobile WWW browsers", Computer Networks and ISDN Systems, vol. 28 Issue 1-2, all pages, Dec. 1995.

Kunz et al., "An Architecture for Adaptive Mobile Applications", all pages, May 13, 1999.

Lauff et al., "Multimedia Client Implementation on Personal Digital Assistants", all pages, Sep. 10-12, 1997.

* cited by examiner

METHODS AND SYSTEMS FOR AUTOMATIC COMMUNICATION LINE MANAGEMENT BASED ON DEVICE LOCATION

RELATED APPLICATIONS

Applicants claim the right to priority under 35 U.S.C. §119(e) based on Provisional Patent Application No. 60/428,704, entitled "DIGITAL COMPANION," filed Nov. 25, 2002; and Provisional Patent Application No. 60/436,018, entitled "DIGITAL COMPANION," filed Dec. 26, 2002, both of which are expressly incorporated herein by reference in their entirety.

The present application also relates to U.S. patent application Ser. No. 10/083,792, entitled "VOICE MAIL INTEGRATION WITH INSTANT MESSENGER," filed Feb. 27, 2002; U.S. patent application Ser. No. 10/083,884, entitled "DEVICE INDEPENDENT CALLER ID," filed Feb. 27, 2002; U.S. patent application Ser. No. 10/083,822, entitled "METHOD AND APPARATUS FOR A UNIFIED COMMUNICATION MANAGEMENT VIA INSTANT MESSAGING," filed Feb. 27, 2002; U.S. patent application Ser. No. 10/083,793, entitled "METHOD AND APPARATUS FOR CALENDARED COMMUNICATIONS FLOW CONTROL," filed Feb. 27, 2002; U.S. patent application Ser. No. 10/084,121, entitled "CALENDAR-BASED CALLING AGENTS," filed Feb. 27, 2002; U.S. patent application Ser. No. 10/720,661, entitled "METHODS AND SYSTEMS FOR DRAG AND DROP CONFERENCE CALLING,"; U.S. patent application Ser. No. 10/720,859, entitled "METHODS AND SYSTEMS FOR CONFERENCE CALL BUFFERING,"; U.S. patent application Ser. No. 10/721,009, entitled "METHODS AND SYSTEMS FOR COMPUTER ENHANCED CONFERENCE CALLING,"; U.S. patent application Ser. No. 10/720,943, entitled "METHODS AND SYSTEMS FOR REMOTE CALL ESTABLISHMENT,"; U.S. patent application Ser. No. 10/721,005, entitled "METHODS AND SYSTEMS FOR CALL MANAGEMENT WITH USER INTERVENTION,"; U.S. patent application Ser. No. 10/720,868, entitled "METHODS AND SYSTEMS FOR DIRECTORY INFORMATION LOOKUP,"; U.S. patent application Ser. No. 10/720,952, entitled "METHODS AND SYSTEMS FOR ADAPTIVE MESSAGE AND CALL NOTIFICATION,"; U.S. patent application Ser. No. 10/720,870, entitled "METHODS AND SYSTEMS FOR A CALL LOG,"; U.S. patent application Ser. No. 12/720,633, entitled "METHODS AND SYSTEMS FOR AUTOMATIC FORWARDING OF CALLS TO A PREFERRED DEVICE,"; U.S. patent application Ser. No. 10/720,971, entitled "METHODS AND SYSTEMS FOR LINE MANAGEMENT,"; U.S. patent application Ser. No. 10/720,784, entitled "METHODS AND SYSTEMS FOR CONTACT MANAGEMENT,"; U.S. patent application Ser. No. 10/720,920, entitled "METHODS AND SYSTEMS FOR NOTIFICATION OF CALL TO PHONE DEVICE,"; U.S. patent application Ser. No. 10/720,825, entitled "METHODS AND SYSTEMS FOR SINGLE NUMBER TEXT MESSAGING,"; U.S. patent application Ser. No. 10/720,944, entitled "METHODS AND SYSTEMS FOR MULTI-USER SELECTIVE NOTIFICATION,"; U.S. patent application Ser. No. 10/720,933, entitled "METHODS AND SYSTEMS FOR CPN TRIGGERED COLLABORATION,"; and U.S. patent application Ser. No. 10/720,938, entitled "METHODS AND SYSTEMS FOR PREEMPTIVE REJECTION OF CALLS,", all of which are expressly incorporated herein by reference in their entirety.

FIELD OF THE INVENTION

The present invention relates generally to communications systems and, more particularly, to methods and systems for automatic communication line management based on the location of a device.

BACKGROUND OF THE INVENTION

A wide variety of means exist for communication between users. For example, a user may conduct phone calls via a home phone, work phone, and mobile phone. In addition, users may also communicate using devices such as PC's, PDA's, pagers, etc. using manners of communicating as e-mail and instant messaging.

Unfortunately, managing such a wide variety of communication means can be difficult. In particular, as a user changes location, communication with the user may vary. For example, while on travel, it may only be possible to reach a user by mobile phone. However, the user may best be reached by e-mail while at work. Also, the user may wish to implement various rules for receiving and controlling communications. For example, to be reached at home, the user may want the home phone to ring three times before forwarding the call to a mobile phone. As another example, the user may wish to be paged each time an e-mail is received from a particular person while away from the office.

Typically, to implement communication management, a person must individually manage each communication device separately. Thus, when the user wishes to change how communication is managed, the user may have to deal with numerous devices and, perhaps, service centers.

SUMMARY OF THE INVENTION

In accordance with the purposes of the invention, as embodied and broadly described herein, methods and systems are provided including a method for managing calls directed to one or more communications devices associated with a user of a communications network. This method includes receiving user-defined preferences regarding handling of calls directed to at least one of the devices, receiving an indication regarding wireless communications between a first device and a second device, and modifying the handling of calls to the one or more communications devices in response to receipt of the indication.

Additional aspects and advantages of the invention will be set forth in part in the description which follows, and in part will be obvious from the description, or may be learned by practice of the invention. Various advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

The accompanying drawings, which are incorporated in and constitute a part of this specification, illustrate one embodiment of the invention and, together with the description, serve to explain the principles of the invention.

DETAILED DESCRIPTION

Reference will now be made in detail to exemplary embodiments of the present invention, examples of which are illustrated in the accompanying drawings. Wherever possible, the same reference numbers will be used throughout the drawings to refer to the same or like parts.

Figure 1:
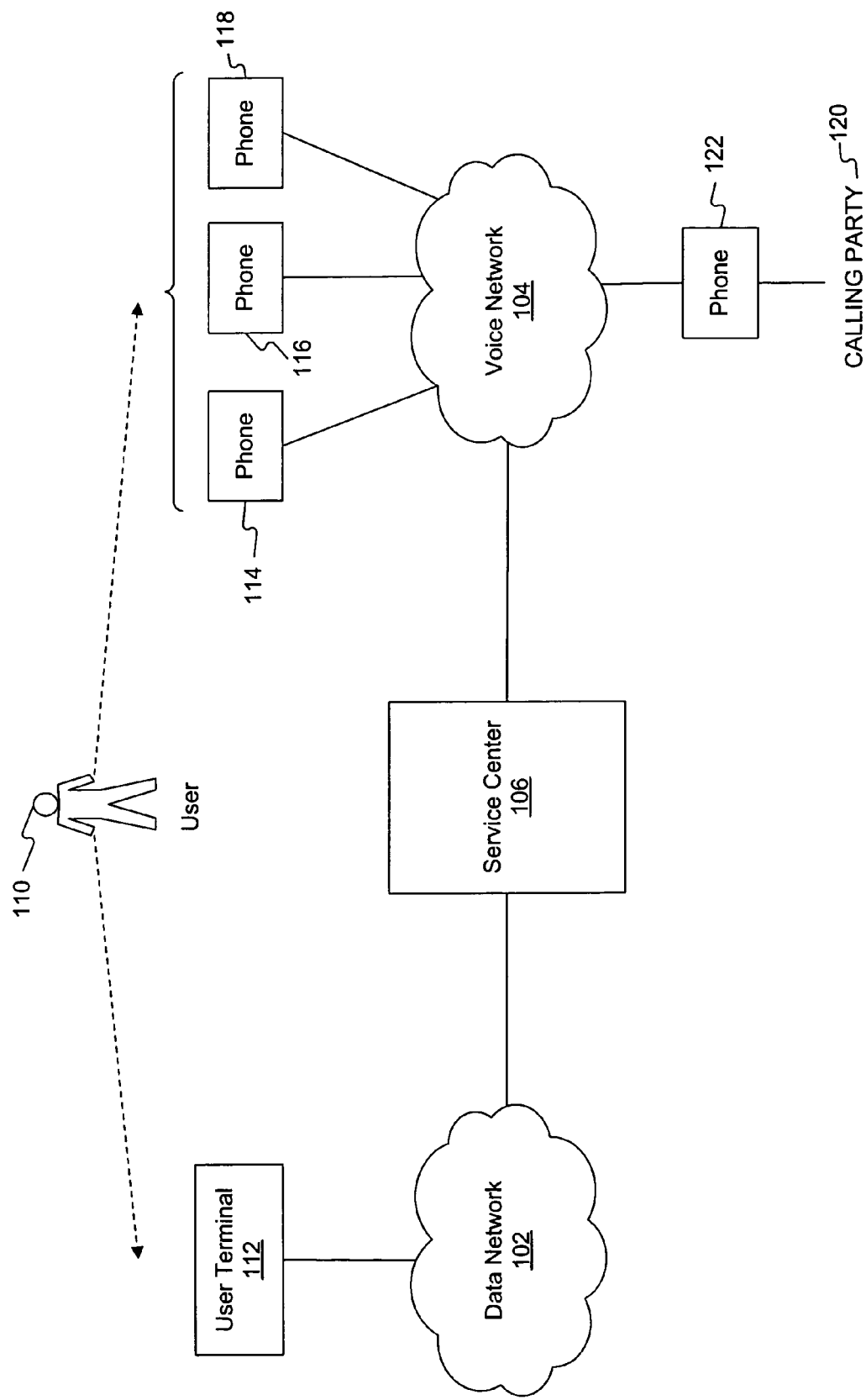
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. A calling party 120 may use a phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a wide area network (WAN), local area network (LAN), an intranet and/or the Internet. Further, service center 106 may be connected to multiple data networks 102, such as, for example, to a wireless carrier network and to the Internet.

Voice network 104 may provide telephony services to allow a calling party, such as calling party 120, to place a call to user 110. In one embodiment, voice network 104 may be implemented using a network, such as the Public Switched Telephone Network ("PSTN"). Alternatively, voice network 104 may be implemented on a voice-over-broadband network, such as, for example, a network using voice-over-Internet Protocol ("VIP") technology. Additionally, in other embodiments, voice network 104 may be a video-over-broadband network, such as, for example, a network for providing 2-way video communications. In another example, voice network 104 may be a wireless broadband network, such as, for example, a network using WiFi (i.e., IEEE 802.11(b) and/or (g)). In yet another example, voice network 104 may be a wireless voice network(s), such as, for example, a cellular or third-generation cellular network). In addition, voice network 104 may be implemented using any single or combination of the above-described technologies consistent with the principles of the present invention. Further, service center 106 may be connected to multiple voice networks 104, such as for example, Verizon's™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
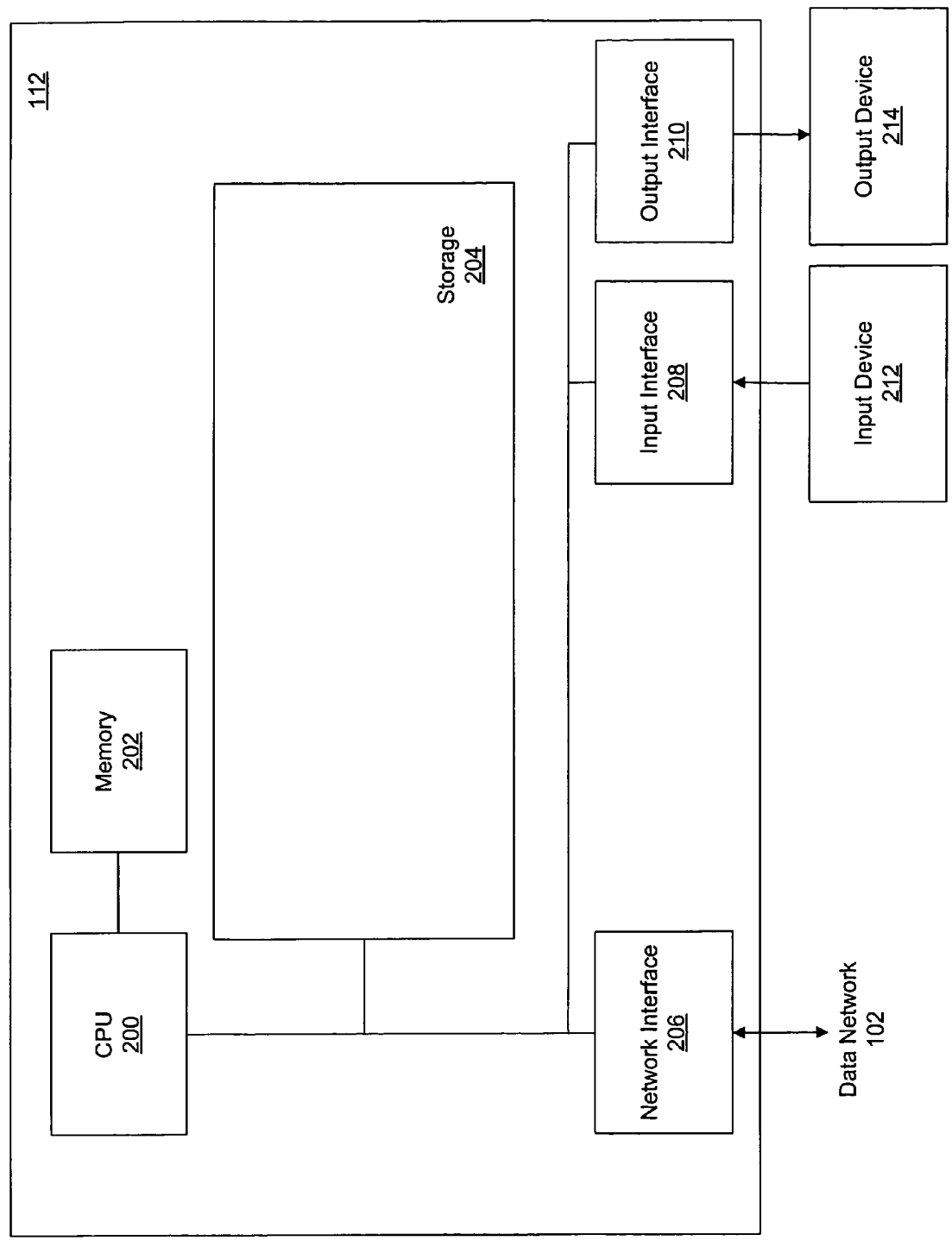
FIG. 2 is a diagram of an exemplary user terminal, consistent with the principals of the present invention.

FIG. 2 is a block diagram of a user terminal 112 consistent with the present invention. User terminal 112 includes a central processing unit (CPU) 200, a memory 202, a storage module 204, a network interface 206, an input interface 208, an output interface 210, an input device 212, and an output device 214.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation.

Memory 202 provides a primary memory for CPU 200, such as for storing program code. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service (MSNMS) client or America Online Instant Messenger (AIM) client; and an Operating System (OS), such as the Windows Operation System provided by Microsoft Corporation. In addition, storage module 204 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, a local area network ("LAN") port, a wireless modem, or a wireless data port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
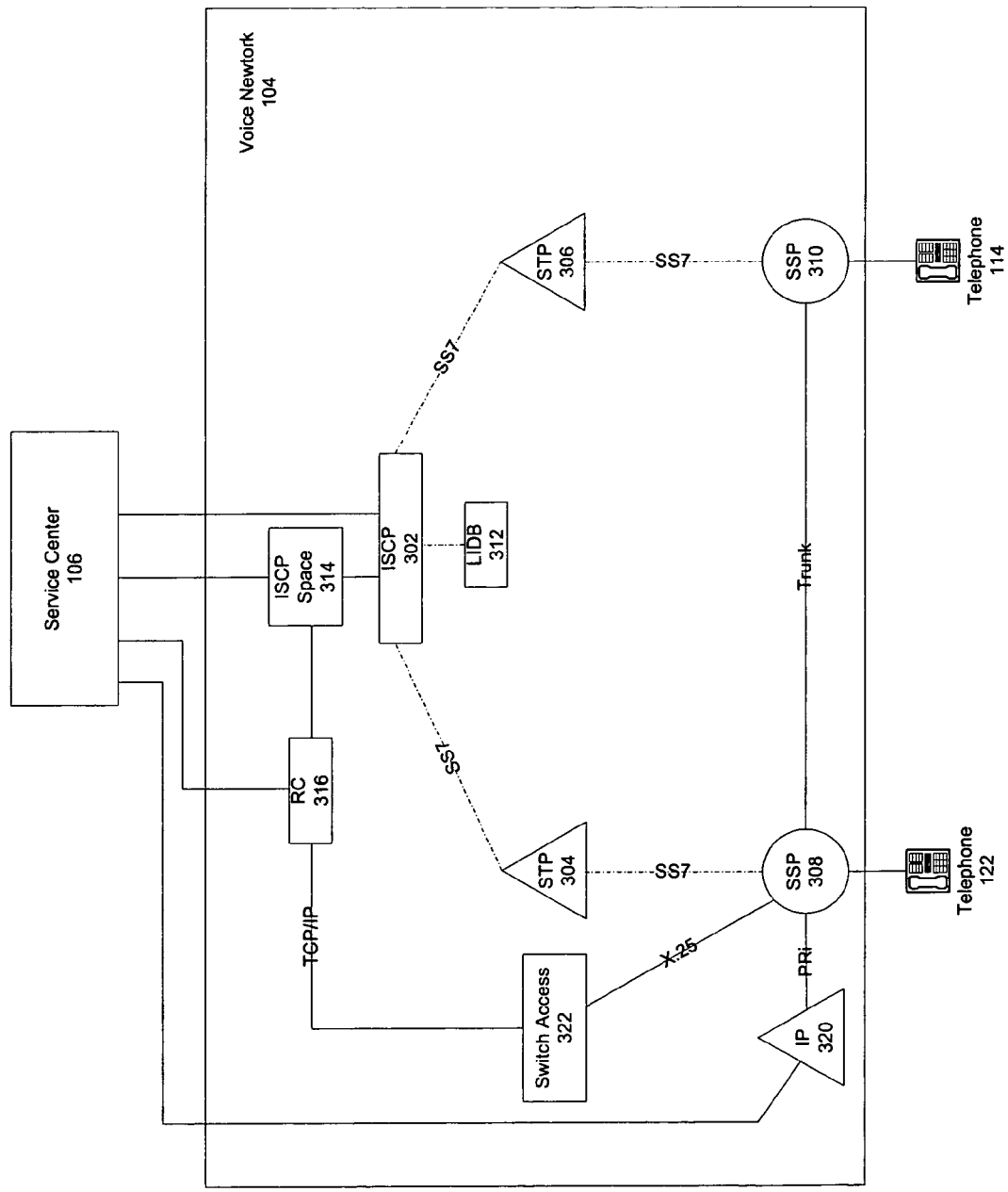
FIG. 3 is a diagram of a voice network, consistent with the principles of the present invention.

FIG. 3 is a diagram of a voice network 104, consistent with the principles of the present invention. As shown, voice network 104 includes an intelligent service control point (ISCP) 302, service transfer points (STP) 304 and 306, service switching points (SSP) 308 and 310, a line information database (LIDB) 312, an ISCP Service Provisioning And Creation Environment (SPACE) 314, a Recent Change Environment 316, and an Intelligent Peripheral (IP) 320. Although voice network 104 in this embodiment is described as a PSTN, as discussed above in other embodiments, voice network 104 may be, for example, a voice- or video-over-broadband network, a wireless broadband network, a wireless voice network, etc.

Voice network 104 may be implemented using the PSTN and SS7 as a signaling protocol. As is know to those skilled in the art, the SS7 protocol allows voice network 104 to provide features such as call forwarding, caller-ID, three-way calling; wireless services such as roaming and mobile subscriber authentication; local number portability; and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point (SCP), an Advanced Intelligent Network (AIN) SCP, a soft switch, or any other network call controller. As used herein, the term service control point (SCP) is a generic term that covers standard SCPs, ISCPs and AIN SCPs. ISCP 302 provides translation and routing services of SS7 messages to support the features of voice network 104, such as call forwarding. In addition, ISCP 302 may exchange information with the service center 106 using TCP/IP or SS7. ISCP 302 may be implemented using a combination of known hardware and software. Although ISCP 302 is shown with both a direct connection to service center 106 and a connection through ISCP SPACE 314, any number of network elements including routers, switches, hubs, etc., may be used to connect ISCP 302, ISCP SPACE 314, and service center 106. Further, information exchanged between the ISCP 302 and service center 106 may use, for example, the SR-3389 General Data Interface (GOI) for TCP/IP.

STPs 304 and 306 relay SS7 messages within voice network 104. For example, STP 304 may route SS7 messages between SSPs 308 and 310. STP 302 may be implemented using known hardware and software from manufacturers such as NORTEL™ and LUCENT Technologies™.

SSPs 308 and 310 provide an interface between voice network 104 and phones 114 and 120, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within message signal units ("MSU") to control calls, perform database queries to configuration database 312, and provide maintenance information.

Line Information Database (LIDB) 312 comprises one or more known databases to support the features of voice network 104. For example, LIDB 312 may comprise a subscriber database, including information, such as a service profile, name and address, and credit card validation information. Although LIDB 312, in this figure, is illustrated as directly connected to ISCP 302, LIDB 312 may be connected to ISCP 302 through an STP (e.g., 304 and 306). Additionally, this communication link may use, for example, the GR-2838 General Dynamic Interface (GDI) for SS7.

ISCP Service Provisioning and Creation Environment (SPACE) 314 may be included as part of the ISCP 302 or be separate from the ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in the ISCP SPACE 314 such that the records may be updated and sent to the ISCP 302. These records may comprise customer records including information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Recent change engine 316 may include one or more engines such as, for example, an Enterprise Recent Change engine (eRC); an Assignment, Activation, and Inventory System (AAIS); or a multi-services platform (MSP). As an example, the eRC and AAIS may be used in voice networks 104 located in the western part of the United States, while an MSP may be used in networks in the eastern part. Recent change engine 316 may be used to update switch and ISCP databases. For example, recent change engine 316 may deliver database updates to SSPs and to ISCPs, such that when updating databases, recent change engine 316 emulates human operators. Additionally, if the instructions are to be sent to an ISCP 302, recent change engine 316 may first send the instructions to the ISCP SPACE 314, which then propagates the instructions to the ISCP 302 as discussed above. Further, an MSP may be used, for example, for providing updates to both the SSPs 308 or 310 and the ISCPs 302. Alternatively, for example, an eRC may be used for providing updates to the SSPs 308 or 310, while an AAIS is used for providing updates to the ISCPs 302. Additionally, updates sent to the SSPs 308 or 310 may be sent from recent change engine 316 via a switch access 320 that may, for example, convert the updates into the appropriate protocol for the SSP 308 or 310. For example, recent change engine 316 may send updates to the SSPs 308 or 310 via TCP/IP. The switch access 320 may then convert the updates from TCP/IP to X.25. This switch access 320 may be any type of hardware and/or software. Additionally, these connections may include any number of elements, such as, for example, switches, routers, hubs, etc. and may be, for example, an internal data network for the voice network 104.

As shown in FIG. 3, voice network 104 may include one or more intelligent peripherals (IPs) 320 connected to SSP 308. These IPs may be used for providing services, such as voice mail services. Additionally, the communications between the SSP 308 and IP 320 may use the Primary Rate interface (PRi) (e.g., the 1129 protocol) protocol. Additionally, IP 320 may be capable of sending and receiving information to/from the Service Center 106. These communications may use, for example, the SR-3511 protocol. Further, although FIG. 3 illustrates the connection between IP 320 and service center 106 as a direct connection, this connection may include any number of elements including routers, switches, hubs, etc., and may be via, for example, an internal data network for the voice network 104.

Figure 4:
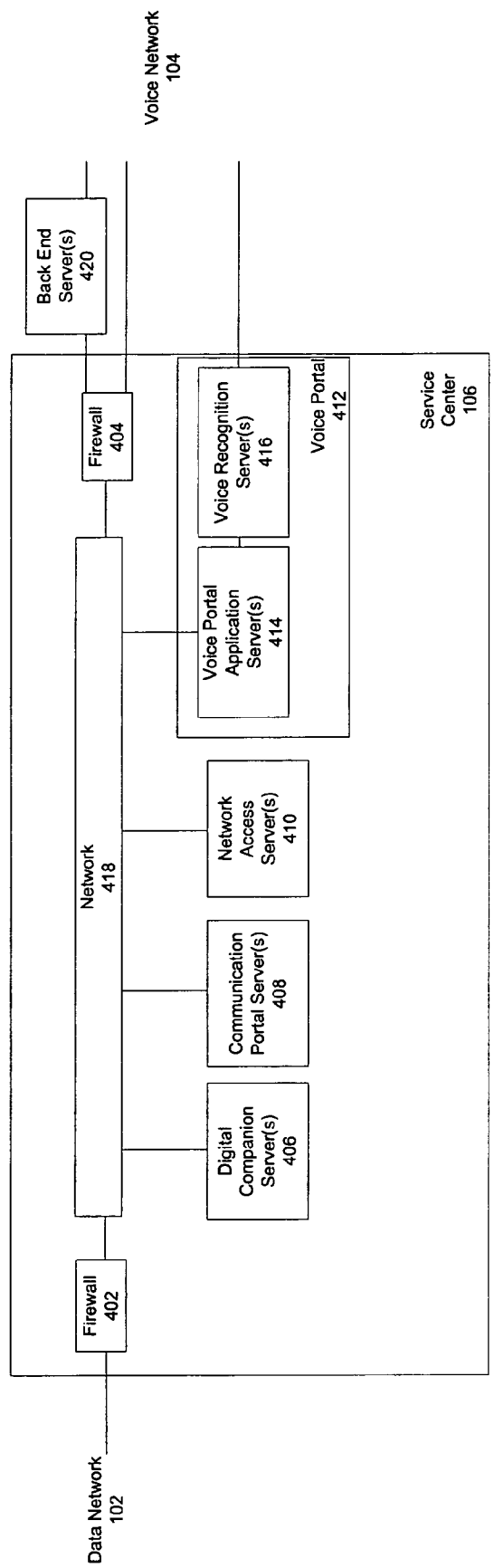
FIG. 4 is a block diagram of a service center, consistent with the principals of the present invention.

FIG. 4 is a block diagram of a service center 106, consistent with the principles of the present invention. As shown, service center 106 may include firewalls 402 and 404, one or more digital companion servers 406, one or more communication portal servers 408, one or more network access servers 410, and a voice portal 412. Voice portal 412 may include a voice portal application server 414 and a voice recognition server 416. A network 418 may be used to interconnect the firewalls and servers. Additionally, back end server(s) 420 may be provided between the service center 106 and the voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any appropriate security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any appropriate type of network, such as an Ethernet or FDDI network. Additionally, network 418 may also include switches and routers as appropriate without departing from the scope of the invention. Further, additional firewalls may be present in network 418, for example, to place one or more of servers 406, 408, 410, or voice portal 412 behind additional firewalls.

Each server (406, 408, 410, 414, 416, 420) may be any appropriate type of server or computer, such as a Unix- or DOS-based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, etc.

Communication portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by the service center. For example, network access servers 410 may be used for transmitting and/or receiving information from/to an ISCP 302 or an SSP 308 or 310 of voice network 104.

Voice portal 412 includes software and hardware for receiving and processing instructions from a customer via voice. For example, a customer may dial a specific number for voice portal 412. Then the customer, using speech, may instruct the service center 105 to modify the services to which the customer subscribes. Voice portal 412 may include, for example, a voice recognition function 416 and an application function 414. Voice recognition function 416 may receive and interpret dictation, or recognize spoken commands. Application function 414 may take, for example, the output from voice recognition function 416, convert it to a format suitable for service center 106 and forward the information to one or more servers (406, 408, 410) in service center 106.

Figure 5:
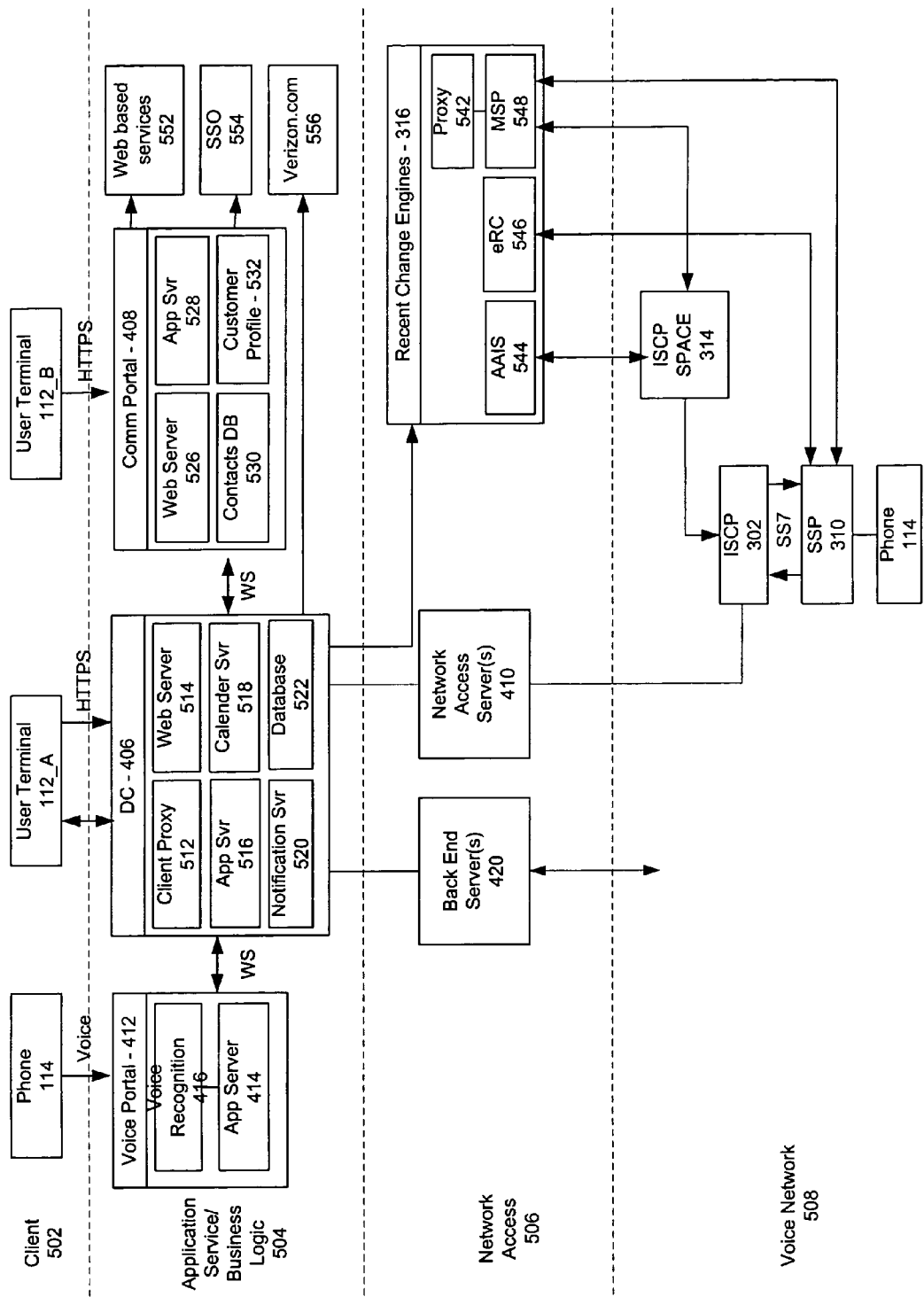
FIG. 5 illustrates a logical architecture of an exemplary system, consistent with the principals of the present invention.

FIG. 5 illustrates a logical architecture of an exemplary system, consistent with the present invention. As illustrated, the logical architecture may be split into four planes: client side 502, application service 504, network access 506, and voice network 508.

Client side 502 includes user terminals 112_A and 112_B that a user may use to send and/or receive information to/from service center 106. Additionally, client side 502 includes user's phone(s) 114. As discussed above, user terminals 112 may be any type of device a user may use for communicating with Service Center 106. For example, user terminal 112_A may be a PDA running a program for communicating with Service Center 106, while user terminal 112_B may be a desktop type computer running a web browser for communicating with the Service Center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet protocol (IP) backbone.

As illustrated, digital companion server 406 may provide the following functions: a client proxy 512, a web server 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. This client proxy function 512 may be included in a separate server such that all communications sent from the other digital companion functions/servers to user terminal 112 via data network 102 go through client proxy 512. Also, if the client proxy 512 is included on a separate server, for example, an additional firewall may be provided between client proxy 512 and other digital companion servers to provide additional security.

Web server 514 provides functionality for receiving traffic over the data network 102 from a customer. For example, web server 514 may be a standard web server that a customer may access using a web browser program, such as Internet Explorer or Netscape Communicator.

Application server function 516 encompasses the general functions performed by digital companion server(s) 406. For example, these functions may include interfacing with the various other digital companion functions to perform specific applications provided by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, etc.

Additionally, application server function 516 may interface with one or more external devices, such as an external web server, for retrieving or sending information. For example, application server function 516 may interface with voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc.

Notification server function 520 provides the capability to send information from service center 106 to user terminal 112. For example, notification server function 520 at the direction of application server function 516 may send a notification to user terminal 112 that the user is presently receiving a phone call at user's phone 114.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as for example, CD-ROMs, DVD's, disk drives, magnetic tape, etc.

As discussed above, communication portal server(s) 408 provide the hardware and software for managing a customer's account and interfacing with customer account information stored by the provider of the customer's voice network 104. As illustrated in FIG. 5, communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 522 of the digital companion servers, provides functionality for receiving traffic over data network 102 from a customer. For example, the web server may be a standard web server that a customer may access using a web browser, such as Internet Explorer or Netscape Communicator.

Application server function 528 encompasses the general functions performed by communication portal servers 406. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as the Internet. Application server function 528 may then provide connectivity over the Internet to external servers 552 that provide web services, such as the Superpages webpage. Application function 528 could then contact these external services 552 to retrieve information, such as an address for a person in the user's address book.

In another example, application server function 528 of communication portal 408 may interface a single sign on (SSO) server 554. SSO 554 may be used to allow users to access all services to which the user subscribes, on the basis of a single authentication that is performed when they initially access the network.

Contacts database 530 includes storage devices for storing an address book for the user. This address book may be any appropriate type of address book. For example, the user's address book may include the names, phone numbers, and addresses of people and/or organizations. These storage devices may be internal or external to communication portal servers 406 or some combination in between. In addition, these storage devices may be any type of storage device, such as magnetic storage, memory storage, etc.

Customer profile database 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Additionally, application services plane 504 of the architecture may include voice portal 412. As discussed above, voice portal 412 may include, for example, a voice recognition function 416 and an application server function 414, and be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server function 414 of voice portal 412 may include hardware and/or software for exchanging information between digital companion servers 406 and voice recognition function 416. Additionally, application server function 414 may be included on a separate server, included in the hardware and software providing voice recognition function 416, included in digital companion servers 406, etc.

Network Access plane 506 of the architecture includes the functions for providing connectivity between application service plane 502 and voice network 104. For example, this plane may include recent change engines 316, network access servers 410, and/or back end servers 420.

As discussed above, recent change engines 316 may be used to update switches and ISCP databases included in voice network 104. In one embodiment, recent change engines 316 may include an AAIS 544, an eRC 546, and/or an MSP 548. Additionally, a proxy 542 may be used between digital companion servers 406 and recent change engines 542 for security purposes.

Network access servers 410 may be included in service center 106 and may provide the hardware and software for sending and receiving information to voice network 410 in processing the applications provided by the service center. For example, network access servers 410 may include a Caller ID (CID) functionality for retrieving caller ID information from voice network 104, a click to dial (CTD) functionality for instructing an intelligent peripheral (IP) in the voice network to place a call via an SSP, and/or a real time call management (RTCM) functionality for interfacing with an ISCP of the voice network.

Network Access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. For example, this voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, these back end server(s) 420 may also include, for example, a directory assistance server. This directory assistance server may, for example, interface service center 106 with a Reverse Directory Assistance Gateway (RDA Gateway) of voice network 104. A RDA Gateway is a device for issuing requests to a Data Operations Center (DOC) of the voice network 104 for name and/or address information associated with a phone number and receiving the name and/or phone number in response to this request.

In another example, back end server(s) 420 may include a wireless internet gateway that is used for interfacing with a mobile switching center (MSC) of a wireless voice network. As with the above-described back end server(s) 420, this wireless internet gateway may be used for converting requests and information between the formats used by service center 106 and those used by the wireless voice network.

In yet another example, back end server(s) 420 may include a conference blasting server for instructing a conference bridge in voice network 106 to dial out via an SSP to the participants of a voice conference. Alternatively, back end server(s) 420 may include a server for instructing an IP of the voice network to place a call between two parties by dialing out to each of the parties. Back end server(s) 420 may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

In yet another example, back end server(s) 420 may include a Single Number Short Message Service (SN SMS) server for interfacing service center 106 with a SMS gateway in voice network 104. This may be used for example to permit the customer to have SMS messages addressed to their home phone number directed to an SMS capable device of the users choosing.

Voice network plane 508 includes the hardware and software included in voice network 104, as discussed above with reference to FIG. 3. For example, voice network plane 508 may include ISCP SPACE 314, ISCP 302, intelligent peripherals 320, and SSP 308. Additionally, voice network plane 508 may also include the hardware and software included in a wireless carrier's network, such as, for example, the mobile switching center, etc.

The following provides a more detailed description of methods and systems for automatically forwarding calls from a communications line to a particular device, in accordance with methods and systems consistent with the invention. As used herein the term "communications line" refers to the physical connection and associated data for connecting a particular device with a communications network. For example, in the PSTN, a communications line may be, for example, the line connecting a user's home to a local switching office, wherein the user may connect a phone to the line to communicate over the PSTN. Alternatively, in wireless system, a communications line may be for example, the data and associated hardware for permitting the wireless network to communicate with a user's wireless device.

As discussed above, user terminal 112_A may execute a client application (hereinafter referred to as the Digital Companion ("DC") client application). This DC client application preferably can access digital companion server(s) 406 via, for example, the Internet. This DC client application preferably may retrieve information from the digital companion server(s) regarding the user's communication devices (e.g., their home phone, work phone, cell phone, etc.) that the user has elected to register for digital companion services. Further, as discussed above, the user may also access and retrieve such information from the digital companion server(s) via a browser operating on a user terminal 112_B via communication portal 408. Alternatively, as discussed above, the user may access and retrieve such information from digital companion server(s) 406 via voice portal 412 using a phone 114.

In this example, the user may be able to register, for example, using the DC client application or browser, one or more communications devices (e.g., phones, wireless PDAs, computers, etc.) with digital companion server(s) 406. This list of devices will be referred to as the user's device profile and may include, for example, a name for the device, a phone number for the device if it is a phone, or an IP address for the device if the device is a device with Internet connectivity (e.g., a wireless PDA, computer, etc.). This information may be provided by the user via, for example, the DC client application or browser. Alternatively, if the communications line for the device is associated with voice network 104, information may be retrieved by communication portal 408, as discussed above.

Additionally, the user may register one or more devices that include a transceiver capable of automatically detecting if the device enters the vicinity (comes within range) of a user terminal 112_A including a corresponding transceiver and establishing communications between the device and user terminal 112_A. These transceivers may use a protocol such as, for example, Bluetooth or WiFi ((i.e., IEEE 802.11(b) and/or (g)), or any other suitable wireless protocol.

For example, Bluetooth-enabled devices typically include operating system software that manages the discovery and registration of new devices coming within the vicinity of each other. The vicinity of the device is hereinafter defined as the range around a transceiver of the device wherein when a device having a like transceiver enters this range it may be discovered by the device. Accordingly, when Bluetooth-enabled devices come within range of one another, an electronic conversation may automatically take place to determine whether the devices have data to share or whether one device needs to control the other. Once this initial discovery conversation has occurred, the Bluetooth devices form a network referred to as a Personal-Area Network (PAN) or "piconet" that may fill a room or may encompass no more distance than that between a Bluetooth-enabled cellphone and a user's Bluetooth-enabled computer. Once a piconet is established, the members randomly hop frequencies in unison so they stay in touch with one another and avoid other piconets that may be operating in the same room.

For ease of explanation, in this exemplary embodiment, the device coming within range of the user terminal 112_A will be referred to as a Bluetooth-enabled wireless phone. However, it should be understood that in other examples this device may be a Bluetooth-enabled Personal Data Assistant (PDA), a WiFi-enabled laptop, etc. The user thus when initially registering the device may specify that the device includes a Bluetooth- or WiFi-transceiver and enter the corresponding information. Alternatively, if the device comes within range of user terminal 112_A, user terminal 112_A may automatically prompt the user regarding whether the user wishes to add this device to their device profile.

Once a user enters the information, the user may elect to save the information. In response, user terminal 112_A may forward the information from user terminal 112_A to digital companion servers 406, which may store the information in database 522. In the future, when the user wishes to access or modify their user device profile, the user can send a query to digital companion servers 406 which can provide user terminal 112_A with their current device profile. For a more detailed description of user devices and methods and systems for automatically forwarding calls, see the above-referenced U.S. patent application Ser. No. 10/720,971, entitled Methods and Systems for Line Management.

As discussed above, in an exemplary embodiment, the user may elect to have all calls for any of their communication devices (i.e., communications devices) automatically handled in a particular manner. The following provides a more detailed description of methods and systems consistent with the invention for automatically forwarding calls to a specific device (e.g., a Bluetooth-enabled device) when the user carries the specific device (e.g., the Bluetooth-enabled device) into or out of a vicinity (e.g., the range of a Bluetooth transceiver included in user terminal 112_A).

Figure 6:
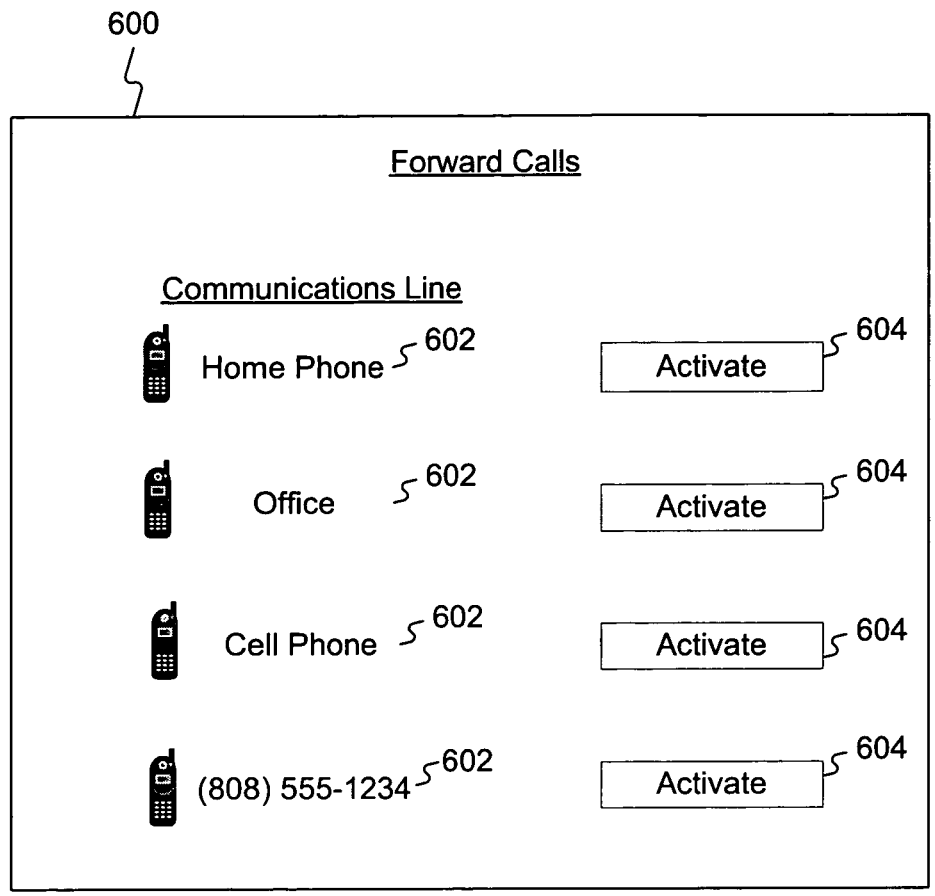
FIG. 6 illustrates an exemplary screen shot of a screen that may be displayed to a user in response to the user electing to activate call forwarding, consistent with the principals of the present invention.

FIG. 6 illustrates an exemplary screen shot of a screen 600 that may be displayed to a user on terminal 112A in response to the user electing to activate call forwarding. As illustrated, screen 600 may display the phone numbers or names 602 for the user's different communication devices along with a corresponding activate call forwarding link 604. If a user desires to forward calls for one of their devices, the user can click on the activate call forwarding link 604 to the right of the phone's number (or name). In response, the user may be presented with a new screen for selecting the number to which the calls are to be forwarded.

Figure 7:
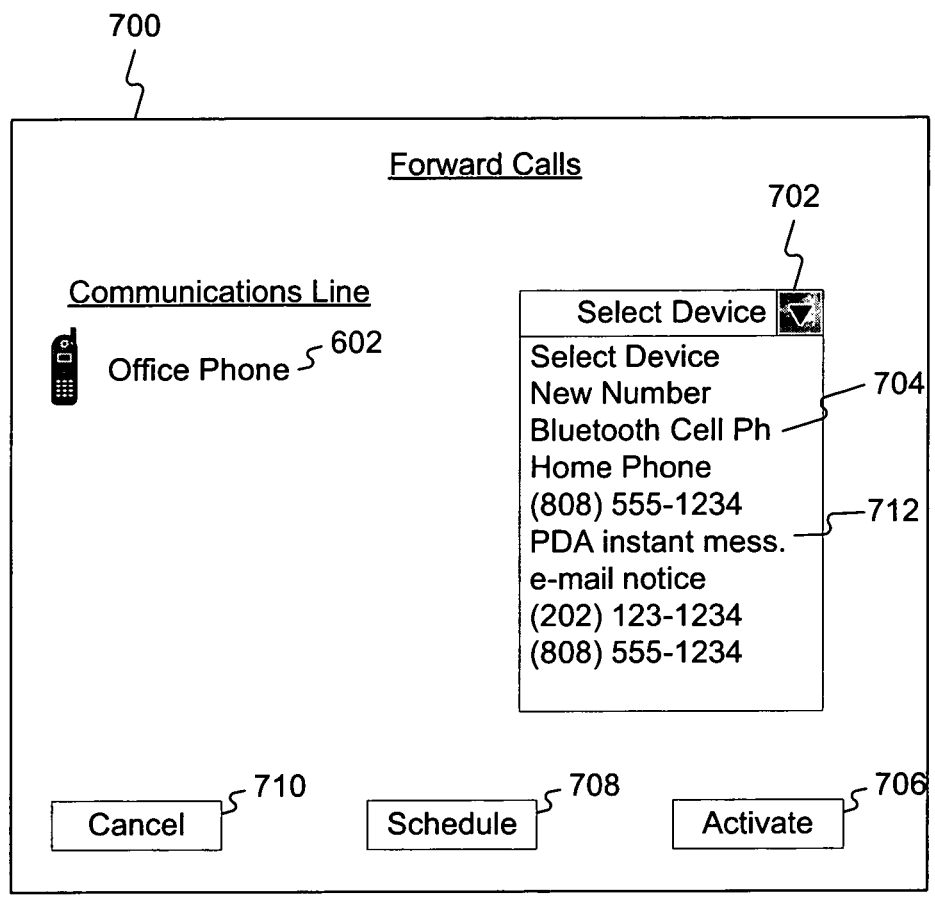
FIG. 7 illustrates an exemplary screen shot of a screen that may be displayed to a user to select a number to which calls are to be forwarded, consistent with the principals of the present invention.

FIG. 7 illustrates an exemplary screen shot of a screen 700 that may be displayed to a user on terminal 112A to select a number to which calls are to be forwarded (hereinafter referred to as a forward-to number). As illustrated, screen 700 may display number 602 to which the user has elected to have calls forwarded. Additionally, screen 700 may display a pull-down list 702 that includes a list of numbers to which the calls are to be forwarded and/or user assigned nicknames for these devices. These numbers in pull down list 702 may include, for example, the numbers and/or names for the other communication devices in the user's device profile, along with any other numbers/names saved by the user. The user may then select from this pull down list 702, for example, to forward calls to their cellular phone. Alternatively, the user may select e-mail notification from this pull-down list to cause an e-mail message regarding the call to be sent to them including information regarding the call. Alternatively, the user may select an instant messaging account 712 to have an instant message regarding the call sent to them.

Once the user has selected the device to which they desire to have calls forwarded, the user may then click on an activate button 706 to have their changes saved so that the desired call forwarding is implemented. Alternatively, the user may click on a cancel button 710 to cancel call forwarding. The above-referenced U.S. patent application Ser. No. 10/720,971 entitled Methods and Systems For Line Management provides for a further description of call forwarding along with scheduling call forwarding As illustrated, pull down list 702 may also include an entry 704 for forwarding calls to a device (e.g., a Bluetooth-enabled wireless phone) that includes a transceiver capable of automatically being detected if the device enters a vicinity (comes within range) of the user terminal 112_A. Although in this example, this device is referred to as a Bluetooth-enabled wireless phone, as discussed above, this device may also be, for example, a Bluetooth-enabled PDA, a WiFi-enabled laptop etc.

Figure 8:
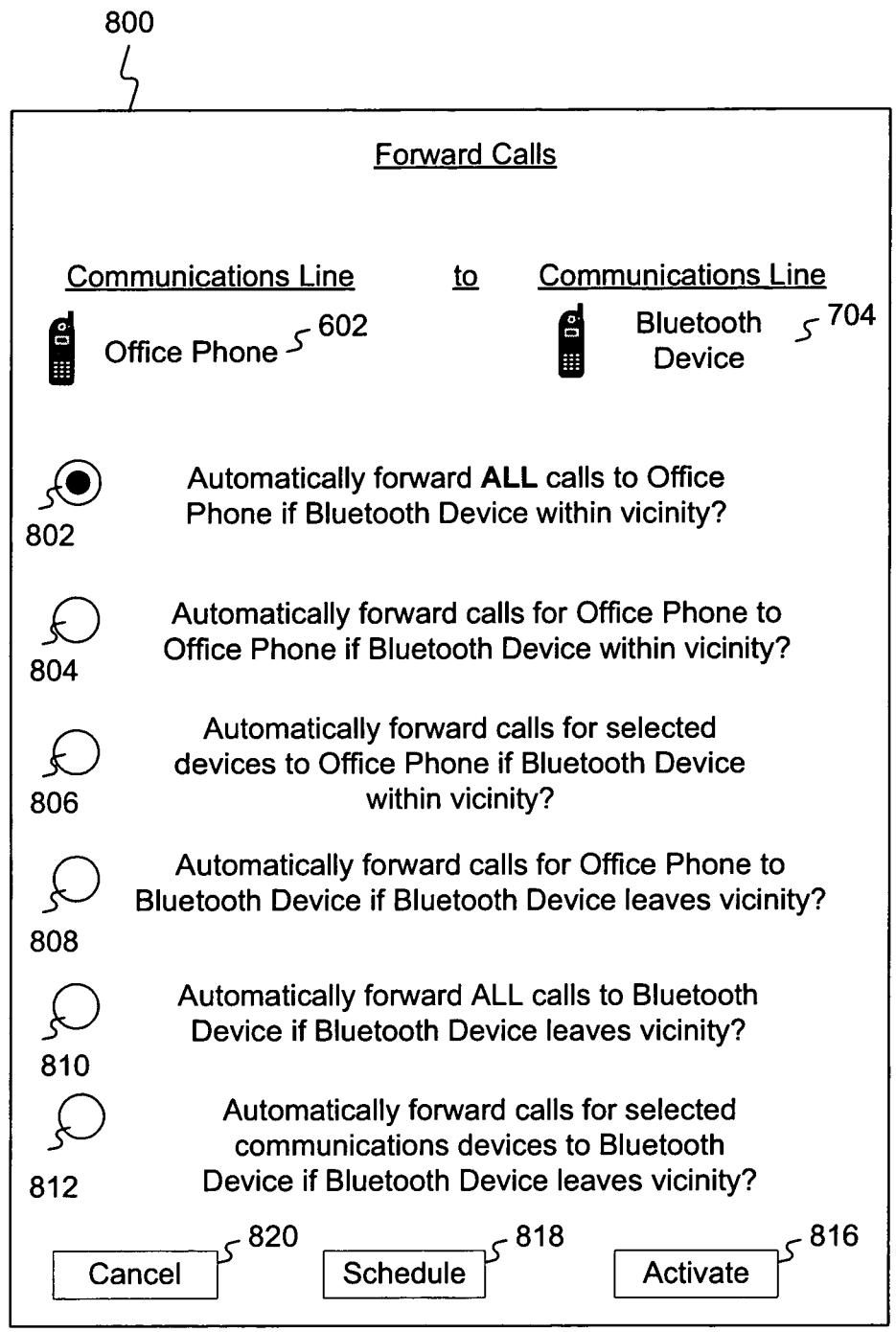
FIG. 8 illustrates an exemplary screen shot of a screen that may be displayed to a user that selected call forwarding regarding the detectable device, consistent with the principals of the present invention.

FIG. 8 illustrates an exemplary screen shot of a screen 800 that may be displayed to a user who has selected call forwarding regarding his Bluetooth-enabled cell phone. As illustrated, the user may be presented with various call forwarding options. For example, the user may select a check box 802 to forward all calls (initially directed by a calling party to any of the user's devices) to the users wireline office phone 602 whenever the users Bluetooth-enabled wireless phone comes within the vicinity (i.e., the range) of the user terminal 112_A, also located in the user's office. Alternatively, the user may select a check box 804 so that only calls initially directed to the user's office phone 602 are sent to the office phone 602, whenever the Bluetooth-enabled wireless phone is in the vicinity of the user terminal 112_A. The user may also select a check box 806 to individually select the devices for which calls thereto are forwarded to their office phone. In the event the user selects check box 806, the user may be presented with a screen listing all their registered communications devices and including corresponding check boxes for selecting which of the devices whose calls are to be forwarded to their office phone.

Additionally, the user may be presented with a check box 808 for selecting to have calls initially directed by a calling party to the users office phone automatically forwarded to the user's Bluetooth-enabled wireless phone 704 in the event the Bluetooth-enabled wireless phone leaves the vicinity (i.e., range) of the user terminal 112_A. Additionally, this screen may also present the user with other options such as, for example, forwarding calls for any of its communications devices or a user specified subset of the user's devices.

Figure 9:
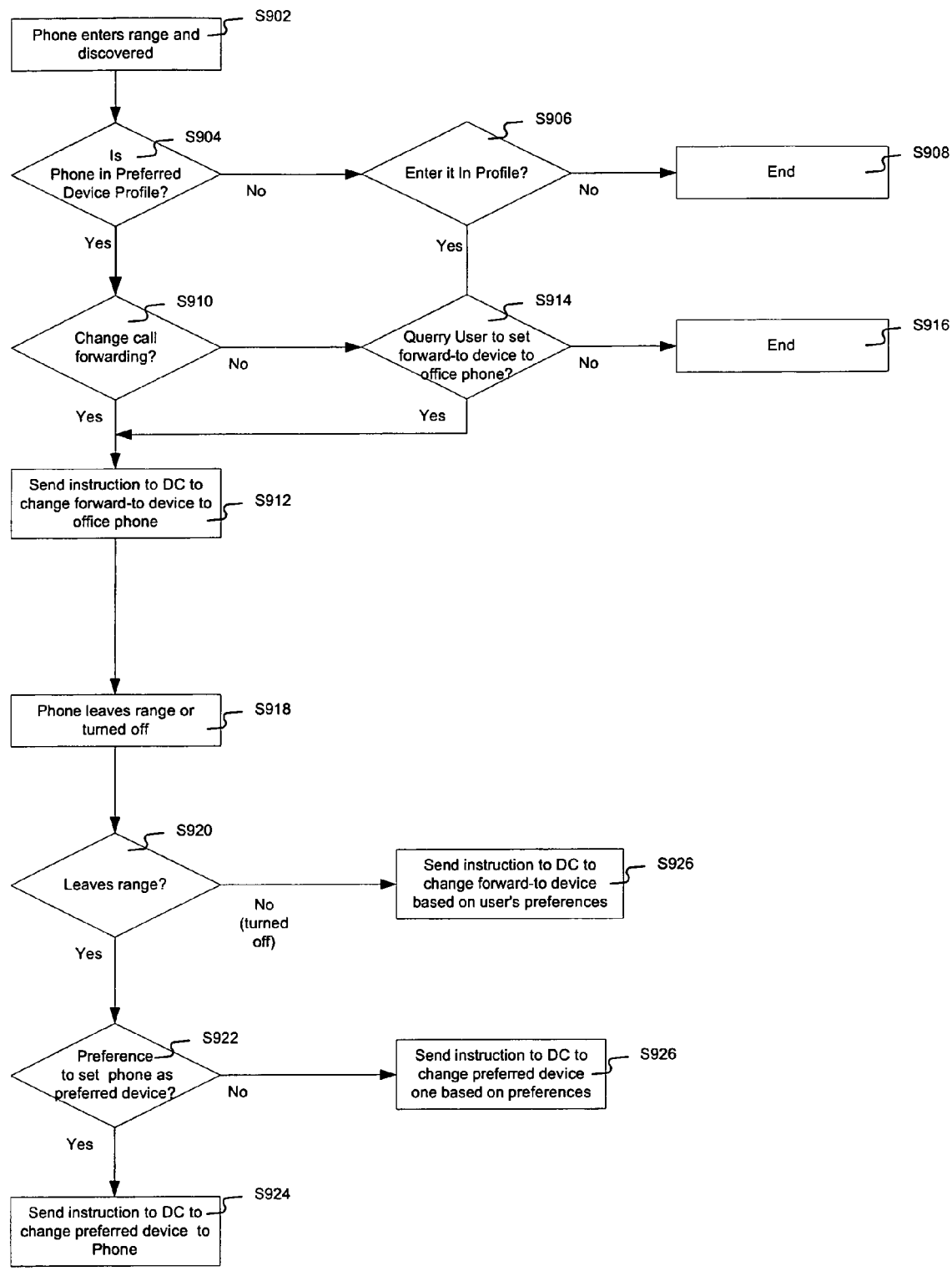
FIG. 9 is a diagram of an exemplary flowchart of a method for establishing automatic forwarding of calls to a specific device, consistent with the principals of the present invention.

FIG. 9 is a diagram of an exemplary flowchart of a method for establishing automatic forwarding of calls to a specific device, in accordance with methods and systems consistent with the invention. Although the steps of the flowchart are described in a particular order, one skilled in the art will appreciate that these steps may be performed in a modified or different order. Further, one or more of the steps in FIG. 9 may be performed concurrently or in parallel.

In this example, the user terminal 112_A includes a transceiver capable of automatically detecting if a device enters its vicinity (comes within range of the user terminal 112_A) and establishing communications with the device. As discussed above, this transceiver and the device may use a protocol such as, for example, Bluetooth or WiFi ((i.e., IEEE 802.11(b) and/or (g)). For ease of explanation, in this example, the device coming within range of the user terminal 112_A will be referred to as a Bluetooth-enabled wireless phone. However, it should be understood that in other examples this device may be for example, Bluetooth-enabled Personal Data Assistant (PDA), a WiFi-enabled laptop, etc.

When the Bluetooth-enabled wireless phone comes within range of the user terminal 112_A, the Bluetooth software running on the user terminal 112_A automatically detects the phone. This detection generates an event that is detected by the DC client application executing on the user terminal 112_A and the DC client application is provided with identification information regarding the phone. (S902).

The DC client application then uses the received identification information to determine if the Bluetooth-enabled wireless phone is registered in the user's device profile. (S904). If the Bluetooth-enabled wireless phone is not in the user's preferred device profile, the DC client application may prompt the user to add the Bluetooth-enabled wireless phone. (S906). This may be accomplished by, for example, displaying a checkbox on a screen of the user terminal 112_A inquiring whether or not the user wishes to add this Bluetooth-enabled wireless phone to their preferred device profile. If the user selects YES, additional screens may be displayed to the user to permit the user to enter a name for the device, a phone number or IP address for the device, etc. If, however, the device is a printer, keyboard, etc., or the user elects to not enter the device in their preferred device profile, the DC client application ignores the event and the flow is terminated. (S908)

If the device is in the user's device profile, the DC client application may query the user's device profile to determine whether or not call forwarding should be changed. (S910). For example, as discussed above, the user may choose to have calls to be forwarded to their office phone in the event their Bluetooth-enabled wireless phone comes within range of the user terminal 112_A, where their office phone sits next to the user terminal 112_A.

If the user's device profile includes a selection that the preferred device be changed in the event the Bluetooth-enabled wireless phone comes in range of the user terminal 112_A, the DC client application of the user terminal 112_A may automatically send an instruction to the DC server(s) 406 to accordingly change call forwarding. (S912)

If, However, No Preference has been Set, the DC Client Application May prompt the user to set up such a preference. (S914). For example, the DC client application may display on user terminal 112_A a prompt informing the user that the Bluetooth-enabled wireless phone was detected and inquiring whether the user wishes to change their preferred device.

If the DC client application is aware that, for example, the office phone is next to the user terminal 112_A, this query may automatically include the option of setting the office phone as the preferred device. In the event the DC client application is not aware that the office phone is in the same area as the user terminal 112_A or the user elects to set another device as their preferred device, the DC client application could then display a listing of all the user's communications devices and allow the user to select from this list a device to which calls should be forwarded (hereinafter referred to as "the forward-to device"), or to enter a new device in this list that the user wishes to set as the forward-to device. This user may also elect to save this option, so that in the event the Bluetooth-enabled wireless phone comes in range of the user terminal 112_A in the future, the DC client application automatically causes calls for all the users devices to be forwarded to the office phone, without the need to query the user.

If the user selects to change their forward-to device, the DC client application then sends an instruction to digital companion servers 406 instructing call forwarding to be changed. If, however, the user does not elect to change their forward-to device, the flow is terminated and no changes are made. (S916)

When the Bluetooth-enabled wireless phone goes out of range (e.g., the user terminal does not receive an Link Management Protocol (LMP) message for more than 30 seconds), the Bluetooth software running on the user terminal detects that the Bluetooth-enabled wireless phone has left the range of the user terminal and generates a corresponding event. (S918). The DC client application then detects this event and based on the event determines that the Bluetooth-enabled wireless phone has left the vicinity (i.e., left the Piconet). (S920).

If the DC client application determines that the Bluetooth-enabled wireless phone has moved out of range, the DC client application then queries the user's device profile to determine whether to switch the user's device to the Bluetooth-enabled wireless phone. (S922). If the user has set up such an instruction, the DC client application then sends an instruction to digital companion server(s) 406 instructing that the forward-to device be changed to the Bluetooth-enabled wireless phone. (S924). Thereafter, digital companion server(s) 406 directs that calls for the user be automatically forwarded to the Bluetooth-enabled wireless phone. As discussed above, the user may select that calls for all of the user's devices, only calls to the office phone, or calls to a subset of the user's devices be forwarded to the Bluetooth-enabled wireless phone. For a more detailed description of methods and systems for forwarding calls to a user's preferred device, see the above-referenced U.S. patent application Ser. No. 10/720,971 entitled Methods and Systems For Line Management.

If, however, the Bluetooth software running on the user terminal 112_A detects that the Bluetooth-enabled wireless phone was powered off or that the user does not wish to forward calls to the Bluetooth-enabled wireless phone, the user terminal's queries the user's device profile to determine which device to set as the user's forward-to device, and then sends an instruction to digital companion server(s) 406 to change the user's forward-to device accordingly. (S926). Digital companion server 406 will then switch the user's preferred device to the one indicated by the user's preferences.

Figure 10:
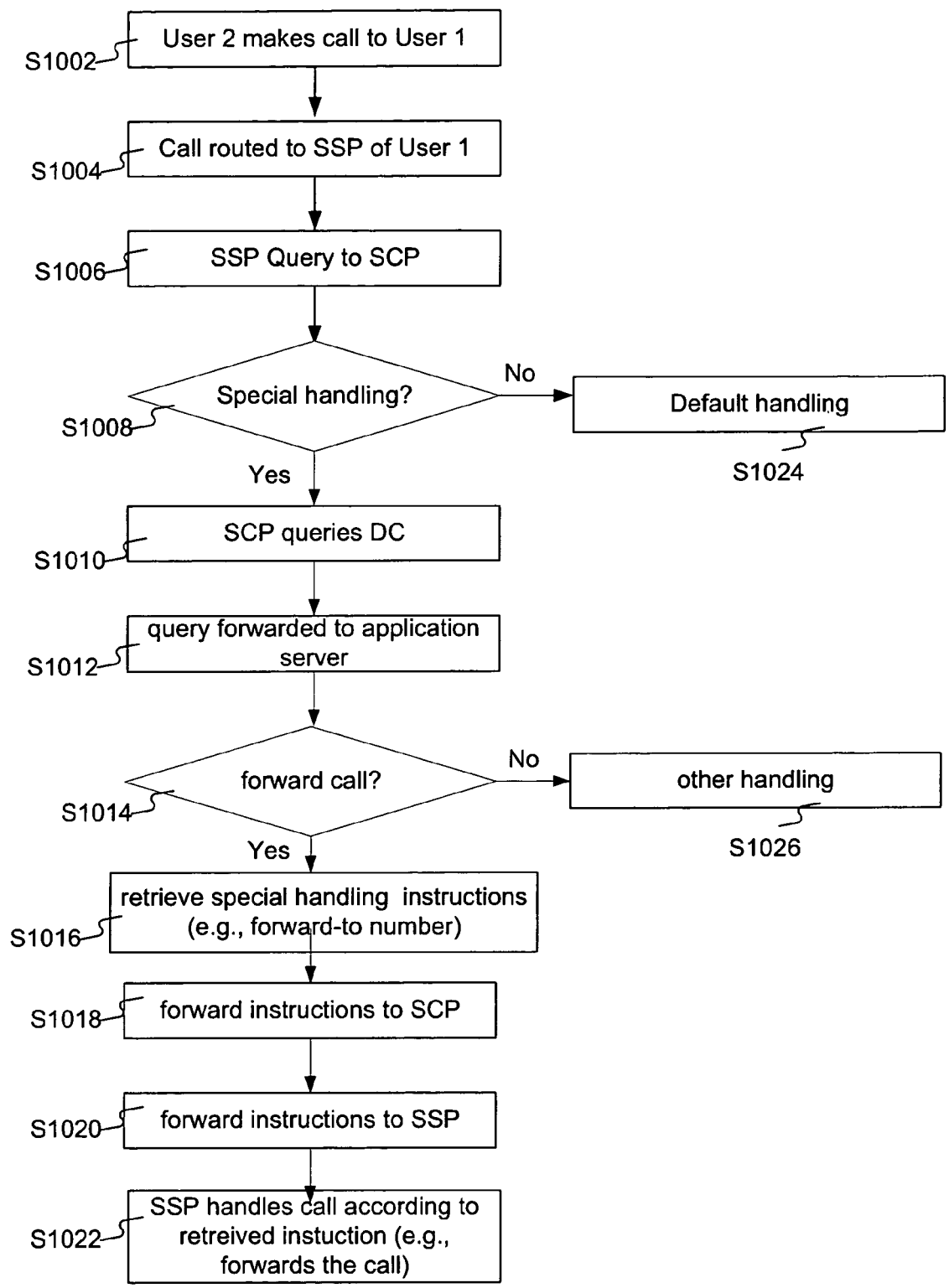
FIG. 10 illustrates a diagram of an exemplary flow chart of a method for automatically forwarding calls, consistent with the principals of the present invention.

FIG. 10 is a diagram of an exemplary flowchart of a method for automatically forwarding calls to a specific device, in accordance with methods and systems consistent with the invention. In this example, it is assumed that the user has a Bluetooth-enabled wireless phone and has selected to have calls for their Office Phone forwarded to the Bluetooth-enabled wireless phone in the event the Bluetooth-enabled wireless phone is not within the vicinity of the user's office computer. Referring back to FIG. 5, in this example, user terminal 112_A is assumed to be the user's office computer, and phone 114 is assumed to be the user's office phone. Additionally, in this example, the Bluetooth-enabled wireless phone has left the vicinity of the user's office computer.

First, a call is placed by a calling party directed to the user's office phone number (i.e, to phone 114). (S1002). The call is then routed by network 104 to SSP 310, which is associated with user phone 114. (S1004). SSP 310 then generates a trigger that is picked up by ISCP 302 (S1006). This trigger may be, for example, a Termination Attempt Trigger (TAT) or a specific Digit String (SDS). ISCP 302 then determines if special handling of the call should be applied (i.e., whether the call should be forwarded to a different communications device, whether the call should be sent directly to voice mail, whether the user should be notified of the call and allowed to direct handling of the call, etc). (S1008). If so, ISCP 302 queries Digital Companion server(s) 406 through network access server 410 (S1010). This query may include the caller-ID of the calling party's phone number (i.e., "caller-ID").

This query is then forwarded to application server 516 of digital companion 406. (S1012). Application server 516 then determines if the call should be forwarded to a different communications device (S1014). If so, application server 516 retrieves the information regarding handling of the call (e.g., the number the call should be forwarded to, hereinafter referred to as the "forward-to" number) (S1016). Application server 516 then instructs ISCP 302 to handle the call according to the retrieved handling instructions (S1018).

For example, application server 516 may determine that the call is to be forwarded to a particular number ("forward-to number"), such as, for example, to the number of a user's Bluetooth-enabled wireless phone. In such an example, application server 516 may send an instruction to forward the call to ISCP 302 via network access server 410 (S1018). ISCP 302 may then instruct SSP 310 to forward the call to the forward-to number, i.e. to the Bluetooth-enabled wireless phone (S1020). In response, SSP 310 forwards the call to the forward-to number (S1022).

In addition to having calls forwarded based on the location of a particular device, the user may also elect to have notification of incoming calls to one of their communications devices sent to different devices based on the location of the particular device. For example, in are embodiment, a user may manage call(s) in real-time. In such an example, service center 106 may receive information from the voice network 104 pertaining to a call directed to one of the user's communications devices. Service center 106 may then send a notification of the call to a device associated with the user. Service center 106 may then receive a response from the user regarding how to handle the call. Service center 106 may then instruct voice network 104 to handle the call in accordance with the instructions received from the user. A further description of real time call management is presented in the above-referenced U.S. patent application Ser. No. 10/721,005, entitled Methods and Systems for Call Management With User Intervention.

In such an example, notification of the call may be sent to user terminal 112A if the user is logged on to service center 106 via user terminal 112_A. As discussed above, however, one of the user's devices such as, for example, a Bluetooth-enabled wireless phone, a Bluetooth-enabled PDA, a WiFi enabled laptop, etc., may include a transceiver which is detected by user terminal 112_A whenever the device comes within range of the user terminal 112_A. For ease in explanation, such device will be referred to a Bluetooth-enabled PDA in the below description. Additionally, in this example, the Bluetooth enable PDA includes wireless capability such that the Bluetooth-enabled PDA may send and receive data over, for example, a wireless network.

As discussed above, the user may receive notification of an incoming call directed to one of the user's communication devices, and the user, in response, may specify how voice network 104 should handle the call. In the present example, the user may specify that the call notification be sent to user terminal 112_A whenever the Bluetooth-enabled PDA is in range of user terminal 112_A. If, however, the Bluetooth-enabled PDA is not in range of user terminal 112_A, notification of the call is to be sent via the wireless network to the Bluetooth-enabled PDA. This election to send notification to devices based on the location of a particular device (e.g., Bluetooth-enabled PDA) may be specified by the user and stored in the user's device profile.

Figure 11:
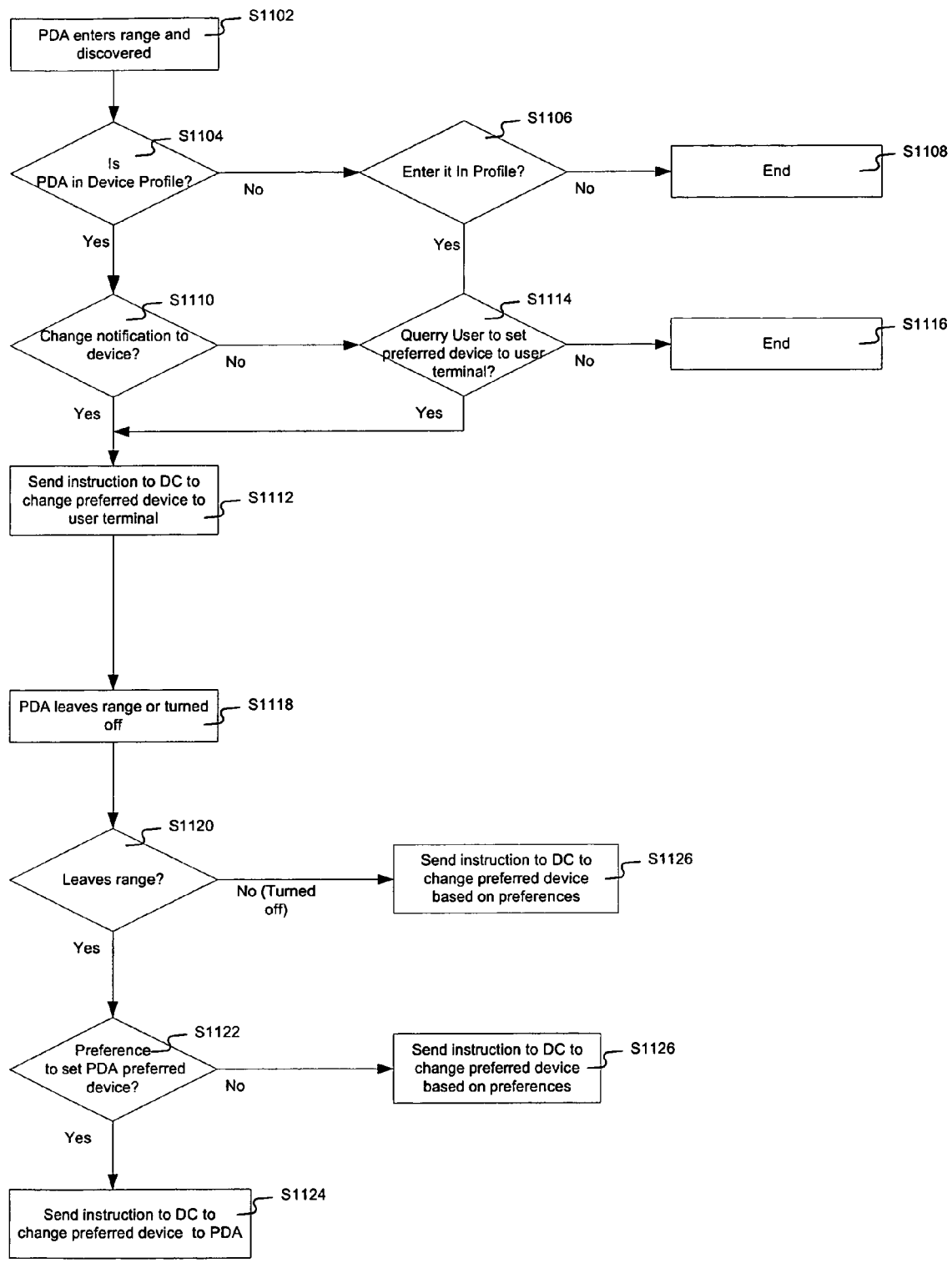
FIG. 11 is a diagram of an exemplary flowchart of a method for establishing automatic forwarding of call notifications to a specific device, consistent with the principals of the present invention.

FIG. 11 is a diagram of an exemplary flowchart of a method for automatically forwarding notification of calls to a specific device, in accordance with methods and systems consistent with the invention. Although the steps of the flowchart are described in a particular order, one skilled in the art will appreciate that these steps may be performed in a modified or different order. Further, one or more of the steps in FIG. 10 may be performed concurrently or in parallel.

When the Bluetooth-enabled PDA comes within range of user terminal 112_A, the Bluetooth software running on user terminal 112_A automatically detects the presence of the PDA. This detection generates an event that is detected by the DC client application executing on user terminal 112_A and the DC client application is provided with identification information regarding the PDA. (S1102).

The DC client application then uses the received identification information to determine if the Bluetooth-enabled PDA is registered in the user's device profile. (S1104). If the Bluetooth-enabled PDA is not in the user's device profile, the DC client application prompts the user to add the device. (S1106). This may be accomplished by, for example, displaying a checkbox on a screen of user terminal 112_A inquiring whether or not the user wishes to add this Bluetooth-enabled PDA to their preferred device profile. If the user selects YES, additional screens may be displayed to the user to permit the user to enter a name, a phone number, or IP address, etc., for the Bluetooth-enabled PDA. If, however, the user elects to not enter the Bluetooth-enabled PDA in their preferred device profile, the DC client application ignores the event and the flow is terminated. (S1108)

If the Bluetooth-enabled PDA is in the user's device profile, the DC client application queries the user's device profile to determine whether or not the device to which notification of incoming calls is sent should be changed. (S1110). The device to which the user specifies for service center 106 is to send notification is hereinafter referred to as the user's "preferred device."

If the user's device profile includes a selection that the preferred device be changed in the event the Bluetooth-enabled PDA comes in range of user terminal 112_A, the DC client application of user terminal 112_A may automatically send an instruction to DC server(s) 406 to change the user's preferred device to the selected device. (S1112)

If, however, no preference has been set, the DC client application may prompt the user to set up such a preference. (S1114). For example, the DC client application may display on user terminal 112_A prompt informing the user that the Bluetooth-enabled PDA was detected and inquiring whether the user wishes to change their preferred device.

If the user selects to change their preferred device, the DC client application then sends an instruction to digital companion servers 406 instructing the preferred device to be changed. If, however, the user does not elect to change their preferred device, the flow is terminated and no changes are made to the preferred device. (S1116)

When the Bluetooth-enabled PDA is turned off or goes out of range (e.g., the user terminal does not receive Link Manager Protocol (LMP) message for more than 30 seconds), the Bluetooth software running on user terminal 112_A detects this event and generates a corresponding event notification. (S1118). The DC client application then detects this notification and determines, based on the notification whether the Bluetooth-enabled PDA moved out of range or was turned off. (S1120).

If the Bluetooth-enabled PDA moved out of range, the DC client application then queries the user's device profile to determine whether to switch the user's preferred device to the Bluetooth-enabled wireless PDA. (S1122). If the user has set up such an instruction, the DC client application then sends an instruction to digital companion server(s) 406 instructing that the preferred device be changed to the Bluetooth-enabled PDA. (S1124). Thereafter, service center 106 sends notifications regarding incoming calls automatically to the Bluetooth-enabled PDA. The user, in response to receipt of notification, may specify how the call should be handled. For a more detailed description of real time call management, see the above-referenced U.S. patent application Ser. No. 10/721,005 entitled, Methods and Systems For Call Management with User Intervention.

If, however, the Bluetooth software running on user terminal 112_A detects that the Bluetooth-enabled PDA was powered off or that the user has not specified that the preferred device should be changed, the DC client application queries the user's device profile to determine which device to set as the user's device, and then sends an instruction to digital companion server(s) 406 to change the user's preferred device accordingly. (S1126).

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A method for managing calls directed to a plurality of communication devices with a user, the method comprising:
   receiving user-defined preferences regarding handling of calls directed to the plurality of communications devices;
   storing the user-defined preferences;
   receiving an indication that a first one of the communications devices has moved within wireless communication range of a terminal;
   forwarding calls intended for at least two of the communications devices to a second one of the communications devices in response to receipt of the indication and based on the user-defined preferences;
   receiving a second indication that the first communications device has moved outside of wireless communication range of the terminal;
   terminating the forwarding of calls to the second communications device in response to receipt of the second indication; and
   forwarding calls intended for at least two of the communications devices to the first communications device in response to receipt of the second indication.

2. The method as recited in claim 1, where receiving an indication comprises receiving an indication using a protocol comprising one of Bluetooth, IEEE 802.11(b) or IEEE 802.11 (g).

3. The method as recited in claim 1, further comprising:
   receiving an indication that the first communications device has deactivated wireless communication with the terminal.

4. The method as recited in claim 1, where the user-defined preferences include a preference regarding forwarding calls to the first communications device when the first communications device is not within wireless communication range of the terminal.

5. The method as recited in claim 1, where the user-defined preferences include a preference regarding forwarding a notification regarding a call based on the received indication.

6. The method as recited in claim 5, further comprising:
receiving, in response to the notification, an instruction regarding handling of the call.

7. The method as recited in claim 6, where the instruction regarding handling of the call includes an instruction regarding forwarding the call to a user specified device.

8. A system for managing a plurality of communications devices associated with a user, the system comprising:
at least one processor configured to:
receive user-defined preferences regarding handling of calls directed to each of the communications devices,
store the user-defined preferences,
receive an indication regarding wireless communications between a first communications device and a second communications device,
forward calls intended for at least two of the communications devices to a third communications device in response to receipt of the indication,
receive a second indication that the first communications device has moved outside of wireless communication range of the second communications device,
terminate the forwarding of calls intended for the at least two of the communications devices to the third communications device in response to receipt of the second indication, and
forward calls intended for the at least two of the communications devices to the first communications device in response to receipt of the second indication.

9. The system as recited in claim 8, where the at least one processor is configured to receive an indication regarding wireless communications using a protocol comprising at least one of Bluetooth, IEEE 802.11(b), or IEEE 802.11(g).

10. The system as recited in claim 8, where the indication indicates that the first communications device has moved within wireless communication range of the second communications device.

11. The system as recited in claim 8, where the at least one processor is further configured to receive a third indication that the first communications device has deactivated wireless communication with the second communications device.

12. The system as recited in claim 8, where the user-defined preferences include a preference regarding forwarding a notification regarding a call based on whether the at least one processor receives an indication regarding wireless communications between the first communications device and the second communications device.

13. The system as recited in claim 12, where the at least one processor is further configured to:
receive, in response to the notification, an instruction regarding handling of the call.

14. The system as recited in claim 12, where the instruction regarding handling of the call includes an instruction regarding forwarding the call to a user specified device.

15. A system for managing a plurality of communications devices associated with a user, the system comprising:
at least one processor configured to:
receive user-defined preferences regarding handling of calls directed to each of the communications devices,
store the user-defined preferences,
receive an indication regarding wireless communications between a first communications device and a second communications device, and
forward calls intended for at least two of the communications devices to a third communications device in response to receipt of the indication,
where the user-defined preferences include a preference indicating that calls intended for at least the third communications device and a fourth communications device are to be forwarded to the first communications device when the first communications device is not within wireless communication range of the second communications device.

16. A system for managing calls directed to a plurality of communications devices associated with a user of a communications network, comprising:
means for receiving user-defined preferences regarding handling of calls directed to the plurality of communications devices;
means for receiving an indication regarding wireless communications between a first communications device and a second communications device;
means for forwarding calls intended for at least two of the communications devices to a third communications device when the indication indicates that the first communications device is within range of the second communications device; and
means for forwarding calls intended for at least two of the communications devices to the first communications device when the indication indicates that the first communications device is not within range of the second communications device.

17. A non-transitory computer-readable medium that includes instructions for performing a method for managing calls directed to one or more communications devices associated with a user of a communications network, comprising:
receiving user-defined preferences regarding handling of calls directed to at least one of the communications devices;
storing the user defined preferences;
receiving an indication regarding wireless communications between a first communications device and a second communications device;
forwarding calls intended for at least two of the communications devices to a third communications device when the indication indicates that the first communications device is within range of the second communications device; and
forwarding calls intended for the third communications device to the first communications device when the indication indicates that the first communications device is not within range of the second communications device.

* * * * *